United States Patent
Atherton et al.

(12) 
(10) Patent No.: US 11,940,995 B1
(45) Date of Patent: *Mar. 26, 2024

(54) KEY PREFIX DRIVEN DATA ENCRYPTION IN TREE STRUCTURES

(71) Applicant: Snowflake Inc., Bozeman, MT (US)

(72) Inventors: Stephen R. Atherton, Sunnyvale, CA (US); Ata E. Husain Bohra, San Jose, CA (US); Yi Wu, San Jose, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/362,321

(22) Filed: Jul. 31, 2023

Related U.S. Application Data

(63) Continuation of application No. 18/087,726, filed on Dec. 22, 2022, now Pat. No. 11,762,846.

(51) Int. Cl.
*G06F 16/23* (2019.01)
*G06F 16/22* (2019.01)
(Continued)

(52) U.S. Cl.
CPC ...... *G06F 16/2379* (2019.01); *G06F 16/2246* (2019.01); *G06F 16/27* (2019.01);
(Continued)

(58) Field of Classification Search
CPC .. G06F 16/2379; G06F 16/2246; G06F 16/27; H04L 9/0643; H04L 9/0861; H04L 9/14; H04L 9/3242
See application file for complete search history.

(56) References Cited

U.S. PATENT DOCUMENTS

| | | | |
|---|---|---|---|
| 11,637,706 B2 * | 4/2023 | Struttmann | G06F 21/602 |
| | | | 709/227 |
| 2016/0077977 A1 * | 3/2016 | Narayanamurthy | H04L 63/123 |
| | | | 713/193 |

(Continued)

OTHER PUBLICATIONS

"U.S. Appl. No. 18/087,726, Notice of Allowance dated May 24, 2023", 24 pgs.

(Continued)

*Primary Examiner* — Abiy Getachew
(74) *Attorney, Agent, or Firm* — Schwegman Lundberg & Woessner, P.A.

(57) ABSTRACT

The subject technology determines a derived encryption key using a cryptographic hash function applied to a hybrid tenant master encryption key and a local random generated identifier. The subject technology encrypts a record value and a key value associated with a transaction using the derived encryption key. The subject technology determines a non-leaf node using a tenant prefix of a tenant. The subject technology inserts the encrypted record value at a leaf node below a non-leaf node of a tree structure associated with the tenant. The subject technology receives a second transaction for performing a read operation on a distributed database. The subject technology retrieves a set of encryption keys based at least in part on an account and the tenant. The subject technology decrypts, using the set of encryption keys, data from the distributed database. The subject technology provides the decrypted data as a result of the second transaction.

30 Claims, 11 Drawing Sheets

(51) Int. Cl.
*G06F 16/27* (2019.01)
*H04L 9/06* (2006.01)
*H04L 9/08* (2006.01)
*H04L 9/14* (2006.01)
*H04L 9/32* (2006.01)

(52) U.S. Cl.
CPC .......... *H04L 9/0643* (2013.01); *H04L 9/0861* (2013.01); *H04L 9/14* (2013.01); *H04L 9/3242* (2013.01)

(56) References Cited

U.S. PATENT DOCUMENTS

| | | | |
|---|---|---|---|
| 2021/0286792 A1* | 9/2021 | Irazabal | H04L 9/0891 |
| 2022/0121650 A1* | 4/2022 | Kim | H04L 9/50 |
| 2022/0188288 A1* | 6/2022 | Dereszynski | G06F 16/2379 |

OTHER PUBLICATIONS

"U.S. Appl. No. 18/087,726, 312 Amendment Filed Jul. 25, 2023", 8 pgs.

* cited by examiner

KEY PREFIX DRIVEN DATA ENCRYPTION IN TREE STRUCTURES

CROSS-REFERENCE TO RELATED APPLICATIONS

This application is a continuation of U.S. Non-Provisional patent application Ser. No. 18/087,726, filed on Dec. 22, 2022, entitled "KEY PREFIX DRIVEN DATA ENCRYPTION IN TREE STRUCTURES," and the contents of which are incorporated herein by reference in their entirety for all purposes.

TECHNICAL FIELD

Embodiments of the disclosure relate generally to a network-based database system or a cloud data platform and, more specifically, to processing transactions in a distributed manner to enable OLTP (Online Transactional Processing) in a safe and performant manner (e.g., avoiding saturation of utilization of resources from a storage cluster) within the database system.

BACKGROUND

Cloud-based data warehouses and other database systems or data platforms sometimes provide support for transactional processing, referred to as OLTP, that enable such systems to perform operations that are not available through the built-in, system-defined functions.

BRIEF DESCRIPTION OF THE DRAWINGS

The present disclosure will be understood more fully from the detailed description given below and from the accompanying drawings of various embodiments of the disclosure.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In database systems, performing transactions on a given database can be supported. To facilitate that a given transaction is committed to a table, existing database systems can employ varying approaches including OLTP techniques. As discussed herein, OLTP (Online Transactional Processing) refers to a category of data processing that involves transaction-oriented tasks. In an example, OLTP involves inserting, updating, and/or deleting varying amounts of data in a given database. OLTP can deal with large numbers of transactions by a large number of users. Increasingly, such transactions occur within and users are working in a distributed and networked environment from varying locations and computing environments. Thus, it is also increasingly important to ensure such transactions execute and complete in a concurrent manner that protects the integrity and consistency of the data in such a distributed environment.

As described herein, the subject technology provides concurrency control and isolation for executing a series of query statements (e.g., SQL statements) within a transaction against a linearizable storage. In particular, the subject technology employs a concurrency control mechanism that is a combination of a multi-version concurrency control for read operations (MVCC) and locking for write operations. Additionally, the subject technology implements a targeted isolation level (e.g., snapshot isolation), where each statement can execute against a different snapshot of a database, and write locks are held until a transaction commit.

Embodiments of the subject technology, provide enterprise encryption data at-rest feature for hybrid tables where an encryption domain is defined as 'KeyPrefix' or also referred to as a "tenant" in some instance, and where a customer's OLTP database is represented as a unique database KeyPrefix. Moreover, embodiments described herein support per-tenant encryption for stored data in a distributed database.

Figure 1:
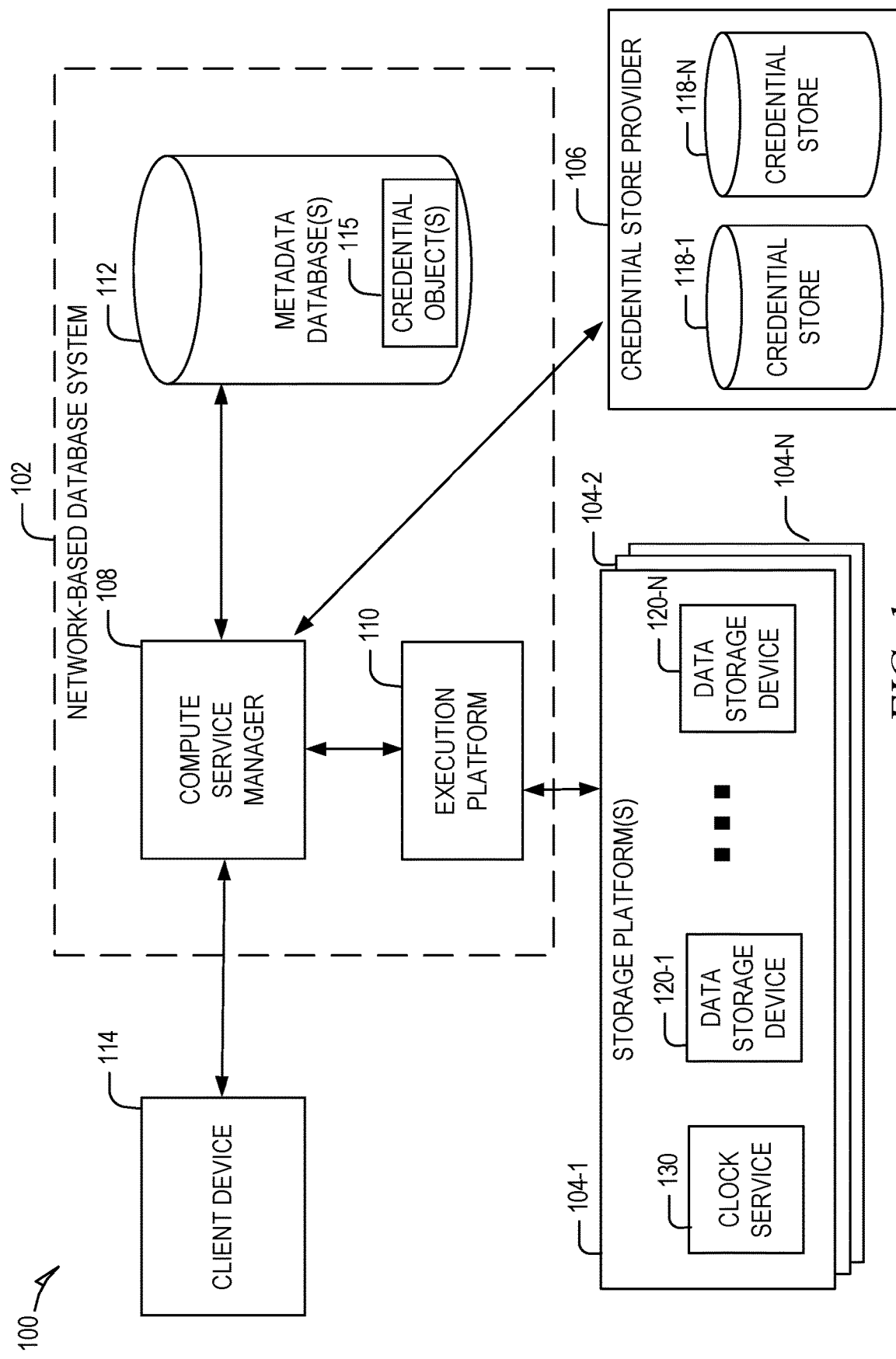
FIG. 1 illustrates an example computing environment that includes a network-based database system in communication with a cloud storage platform, in accordance with some embodiments of the present disclosure.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based database system 102 in communication with a cloud storage platform 104-1 (e.g., AWS®, Microsoft Azure Blob Storage®, or Google Cloud Storage), and a cloud credential store provider 106. The network-based database system 102 is a network-based system used for reporting and analysis of integrated data from one or more disparate sources including one or more storage locations within the cloud storage platform 104-1. The cloud storage platform 104-1 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104-1) and the local caches. Information stored by a metadata database 112 allows systems and services to determine whether a piece of data needs to be accessed without loading or accessing the actual data from a storage device.

As another example, a metadata database 112 can store one or more credential objects 115. In general, a credential object 115 indicates one or more security credentials to be retrieved from a remote credential store. For example, the credential store provider 106 maintains multiple remote credential stores 118-1 to 118-N. Each of the remote credential stores 118-1 to 118-N may be associated with a user account and may be used to store security credentials associated with the user account. A credential object 115 can indicate one of more security credentials to be retrieved by the compute service manager 108 from one of the remote credential stores 118-1 to 118-N (e.g., for use in accessing data stored by the cloud storage platform 104-1).

The compute service manager 108 is further coupled to the execution platform 110, which provides multiple computing resources that execute various data storage and data retrieval tasks. The execution platform is coupled to one of a storage platform (e.g., cloud storage platform 104-1, cloud storage platform 104-2, cloud storage platform 104-N). The cloud storage platform 104-1 comprises multiple data storage devices 120-1 to 120-N, and each other storage platform can also include multiple data storage devices. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems or any other data storage technology. Additionally, the storage platform 104 may include distributed file systems (such as Hadoop Distributed File Systems (HDFS)), object storage systems, and the like. Similarly, any of the data storage devices in other storage platforms as discussed further herein can also have similar characteristics described above in connection with cloud storage platform 104-1.

In an embodiment, each storage platform can provide a different domain or type of storage. For example, cloud storage platform 104-1 may provide storage for a database that stores tables using micro-partitions as discussed further herein, and storage platform 104-2 may provide storage for linearizable storage corresponding to a distributed database (e.g., FoundationDB) that stores tables in a key-value format. Thus, in an implementation, different storage platforms can be utilized for cross domain transactions against different types of databases as discussed further below. In another embodiment, the same storage platform can be utilized for such cross domain transactions where different data storage devices (e.g., data storage device 120-1 and data storage device 120-N) can be utilized for a first type of database (database tables based on micro-partitions) and a second type of database (e.g., linearizable storage tables).

As shown in FIG. 1, the data storage devices 120-1 to 120-N are decoupled from the computing resources associated with the execution platform 110. This architecture supports dynamic changes to the network-based database system 102 based on the changing data storage/retrieval needs as well as the changing needs of the users and systems. The support of dynamic changes allows the network-based database system 102 to scale quickly in response to changing demands on the systems and components within the network-based database system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

As further shown, the cloud storage platform 104-1 includes clock service 130 which can be contacted to fetch a number that will be greater than any number previously returned, such as one that correlates to the current time.

Clock service 130 is discussed further herein below with respect to embodiments of the subject system.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

The compute service manager 108, metadata database(s) 112, execution platform 110, and cloud storage platform 104-1, are shown in FIG. 1 as individual discrete components. However, each of the compute service manager 108, metadata database(s) 112, execution platform 110, and cloud storage platform 104-1 may be implemented as a distributed system (e.g., distributed across multiple systems/platforms at multiple geographic locations). Additionally, each of the compute service manager 108, metadata database(s) 112, execution platform 110, and cloud storage platform 104-1 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks (or transactions as discussed further herein) and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104-1. It is desirable to retrieve as much data as possible from caches within the execution platform 110 because the retrieval speed is typically much faster than retrieving data from the cloud storage platform 104-1.

In embodiments, the compute service manager 108 is also coupled to one or more metadata databases 112 that store metadata pertaining to various functions and aspects associated with the network-based database system 102 and its users. In an embodiment, a data structure can be utilized for storage of database metadata in the metadata database. For example, such a data structure may be generated from metadata micro-partitions and may be stored in a metadata cache memory. The data structure includes table metadata pertaining to database data stored across a table of the database. The table may include multiple micro-partitions serving as immutable storage devices that cannot be updated in-place. Each of the multiple micro-partitions can include numerous rows and columns making up cells of database data. The table metadata may include a table identification and versioning information indicating, for example, how many versions of the table have been generated over a time period, which version of the table includes the most up-to-date information, how the table was changed over time, and so forth. A new table version may be generated each time a transaction is executed on the table, where the transaction may include a DML statement such as an insert, delete, merge, and/or update command. Each time a DML statement is executed on the table, and a new table version is generated, one or more new micro-partitions may be generated that reflect the DML statement.

In an embodiment, the aforementioned table metadata includes global information about the table of a specific version. The aforementioned data structure further includes file metadata that includes metadata about a micro-partition of the table. The terms "file" and "micro-partition" may each refer to a subset of database data and may be used interchangeably in some embodiments. The file metadata includes information about a micro-partition of the table. Further, metadata may be stored for each column of each micro-partition of the table. The metadata pertaining to a column of a micro-partition may be referred to as an expression property (EP) and may include any suitable information about the column, including for example, a minimum and maximum for the data stored in the column, a type of data stored in the column, a subject of the data stored in the column, versioning information for the data stored in the column, file statistics for all micro-partitions in the table, global cumulative expressions for columns of the table, and so forth. Each column of each micro-partition of the table may include one or more expression properties. It should be appreciated that the table may include any number of micro-partitions, and each micro-partition may include any number of columns. The micro-partitions may have the same or different columns and may have different types of columns storing different information. As discussed further herein, the subject technology provides a file system that includes "EP" files (expression property files), where each of the EP files stores a collection of expression properties about corresponding data. As described further herein, each EP file (or the EP files, collectively) can function similar to an indexing structure for micro-partition metadata. Stated another way, each EP file contains a "region" of micro-partitions, and the EP files are the basis for persistence, cache organization and organizing the multi-level structures of a given table's EP metadata. Additionally, in some implementations of the subject technology, a two-level data structure (also referred to as "2-level EP" or a "2-level EP file") can at least store metadata corresponding to grouping expression properties and micro-partition statistics.

As mentioned above, a table of a database may include many rows and columns of data. One table may include millions of rows of data and may be very large and difficult to store or read. A very large table may be divided into multiple smaller files corresponding to micro-partitions. For example, one table may be divided into six distinct micro-partitions, and each of the six micro-partitions may include a portion of the data in the table. Dividing the table data into multiple micro-partitions helps to organize the data and to find where certain data is located within the table.

In an embodiment, all data in tables is automatically divided into an immutable storage device referred to as a micro-partition. The micro-partition may be considered a batch unit where each micro-partition has contiguous units of storage. By way of example, each micro-partition may contain between 50 MB and 500 MB of uncompressed data (note that the actual size in storage may be smaller because data may be stored compressed).

Groups of rows in tables may be mapped into individual micro-partitions organized in a columnar fashion. This size and structure allow for extremely granular selection of the micro-partitions to be scanned, which can be composed of millions, or even hundreds of millions, of micro-partitions. This granular selection process may be referred to herein as "pruning" based on metadata as described further herein.

In an example, pruning involves using metadata to determine which portions of a table, including which micro-partitions or micro-partition groupings in the table, are not pertinent to a query, and then avoiding those non-pertinent micro-partitions (e.g., files) and micro-partition groupings (e.g., regions) when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

The micro-partitions as described herein can provide considerable benefits for managing database data, finding database data, and organizing database data. Each micro-partition organizes database data into rows and columns and stores a portion of the data associated with a table. One table may have many micro-partitions. The partitioning of the database data among the many micro-partitions may be done in any manner that makes sense for that type of data.

A query may be executed on a database table to find certain information within the table. To respond to the query, a compute service manager 108 scans the table to find the information requested by the query. The table may include millions and millions of rows, and it would be very time consuming and it would require significant computing resources for the compute service manager 108 to scan the entire table. The micro-partition organization along with the systems, methods, and devices for database metadata storage of the subject technology provide significant benefits by at least shortening the query response time and reducing the amount of computing resources that are required for responding to the query.

The compute service manager 108 may find the cells of database data by scanning database metadata. The multiple level database metadata of the subject technology enables the compute service manager 108 to quickly and efficiently find the correct data to respond to the query. The compute service manager 108 may find the correct table by scanning table metadata across all the multiple tables in a given database. The compute service manager 108 may find a correct grouping of micro-partitions by scanning multiple grouping expression properties across the identified table. Such grouping expression properties include information about database data stored in each of the micro-partitions within the grouping.

The compute service manager 108 may find a correct micro-partition by scanning multiple micro-partition expression properties within the identified grouping of micro-partitions. The compute service manager 108 may find a correct column by scanning one or more column expression properties within the identified micro-partition. The compute service manager 108 may find the correct row(s) by scanning the identified column within the identified micro-partition. The compute service manager 108 may scan the grouping expression properties to find groupings that have data based on the query. The compute service manager 108 reads the micro-partition expression properties for that grouping to find one or more individual micro-partitions based on the query. The compute service manager 108 reads column expression properties within each of the identified individual micro-partitions. The compute service manager 108 scans the identified columns to find the applicable rows based on the query.

In an embodiment, an expression property is information about the one or more columns stored within one or more micro-partitions. For example, multiple expression properties are stored that each pertain to a single column of a single micro-partition. In an alternative embodiment, one or more expression properties are stored that pertain to multiple columns and/or multiple micro-partitions and/or multiple tables. The expression property is any suitable information about the database data and/or the database itself. In an embodiment, the expression property includes one or more of: a summary of database data stored in a column, a type of database data stored in a column, a minimum and maximum for database data stored in a column, a null count for database data stored in a column, a distinct count for database data stored in a column, a structural or architectural indication of how data is stored, and the like. It is appreciated that a given expression property is not limited to a single column, and can also be applied to a predicate. In addition, an expression property can be derived from a base expression property of all involving columns.

In an embodiment, the metadata organization structures of the subject technology may be applied to database "pruning" based on the metadata as described further herein. The metadata organization may lead to extremely granular selection of pertinent micro-partitions of a table. Pruning based on metadata is executed to determine which portions of a table of a database include data that is relevant to a query. Pruning is used to determine which micro-partitions or groupings of micro-partitions are relevant to the query, and then scanning only those relevant micro-partitions and avoiding all other non-relevant micro-partitions. By pruning the table based on the metadata, the subject system can save significant time and resources by avoiding all non-relevant micro-partitions when responding to the query. After pruning, the system scans the relevant micro-partitions based on the query.

In an embodiment, the metadata database includes EP files (expression property files), where each of the EP files store a collection of expression properties about corresponding data. As mentioned before, EP files provide a similar function to an indexing structure into micro-partition metadata. Metadata may be stored for each column of each micro-partition of a given table. In an embodiment, the aforementioned EP files can be stored in a cache provided by the subject system for such EP files (e.g., "EP cache").

As shown in FIG. 1, the computing environment 100 separates the execution platform 110 from the cloud storage platform 104-1. In this arrangement, the processing resources and cache resources in the execution platform 110 operate independently of the data storage devices 120-1 to 120-N in the cloud storage platform 104-1. Thus, the computing resources and cache resources are not restricted to specific data storage devices 120-1 to 120-N. Instead, all computing resources and all cache resources may retrieve data from, and store data to, any of the data storage resources in the cloud storage platform 104-1.

Figure 2:
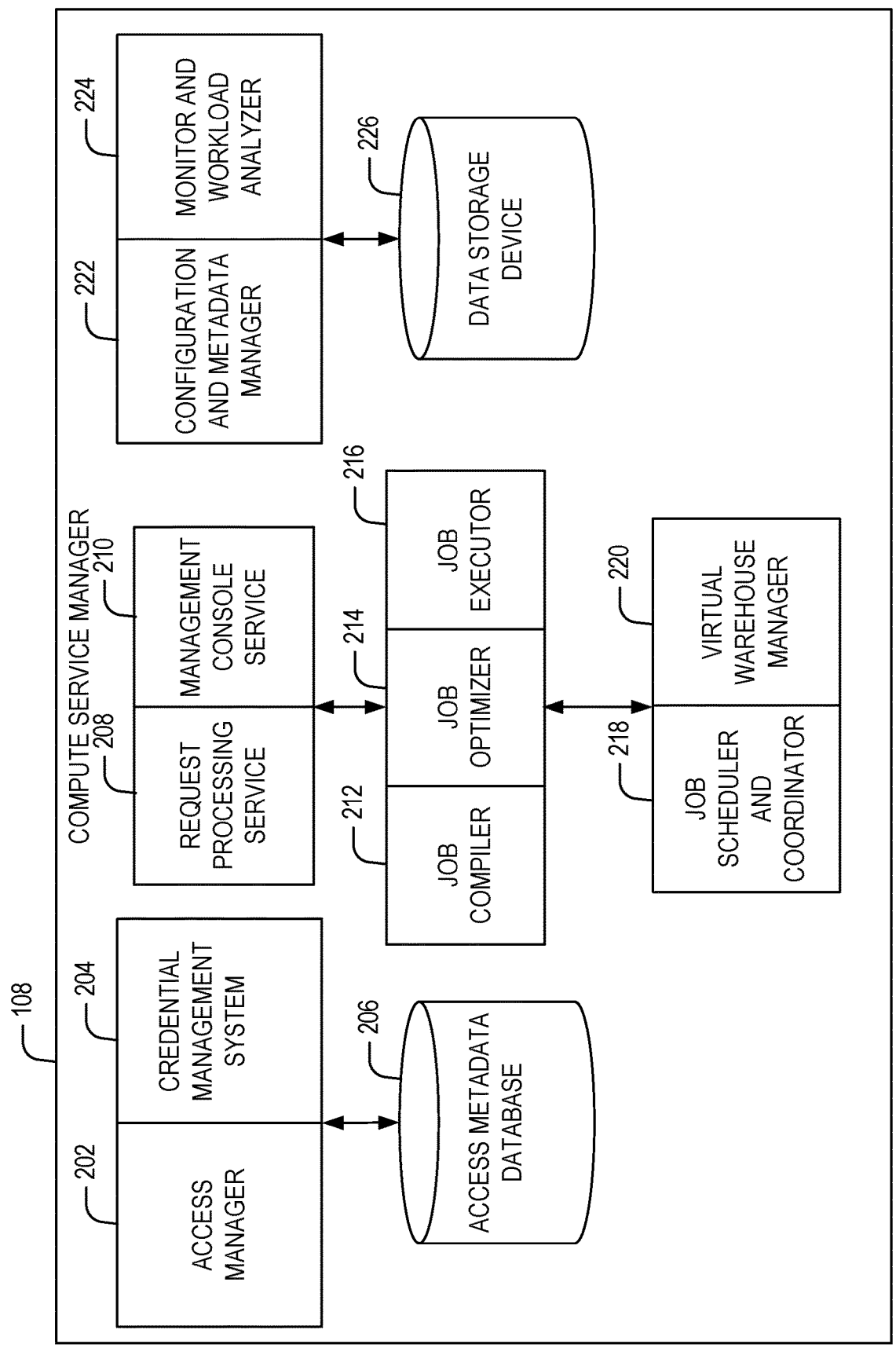
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates use of remote stored credentials (e.g., credentials stored in one of the remote credential stores 118-1 to 118-N) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store (e.g., one or more of the remote credential stores 118-1 to 118-N) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database (e.g., the storage platform 104) but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
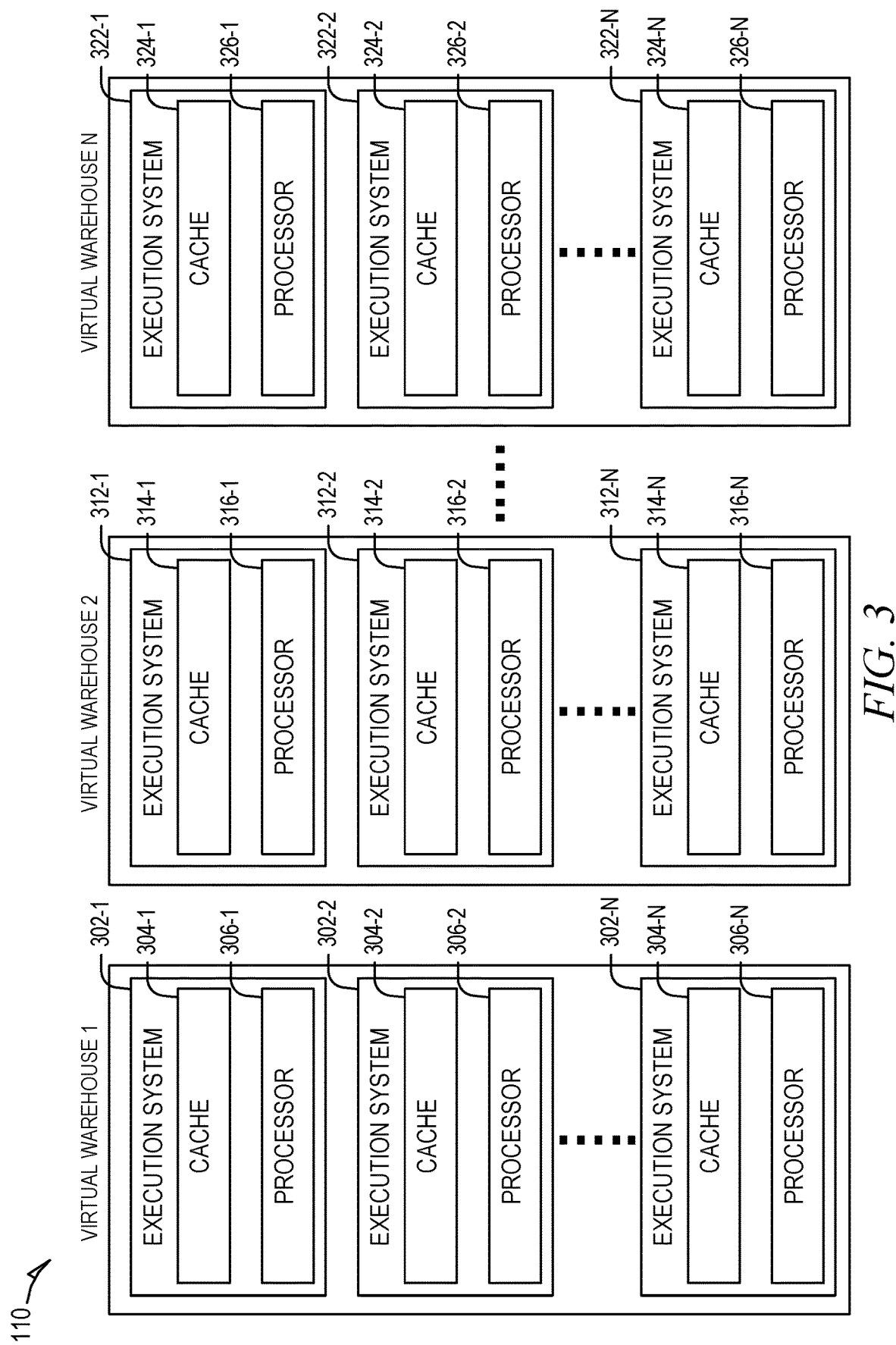
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4A:
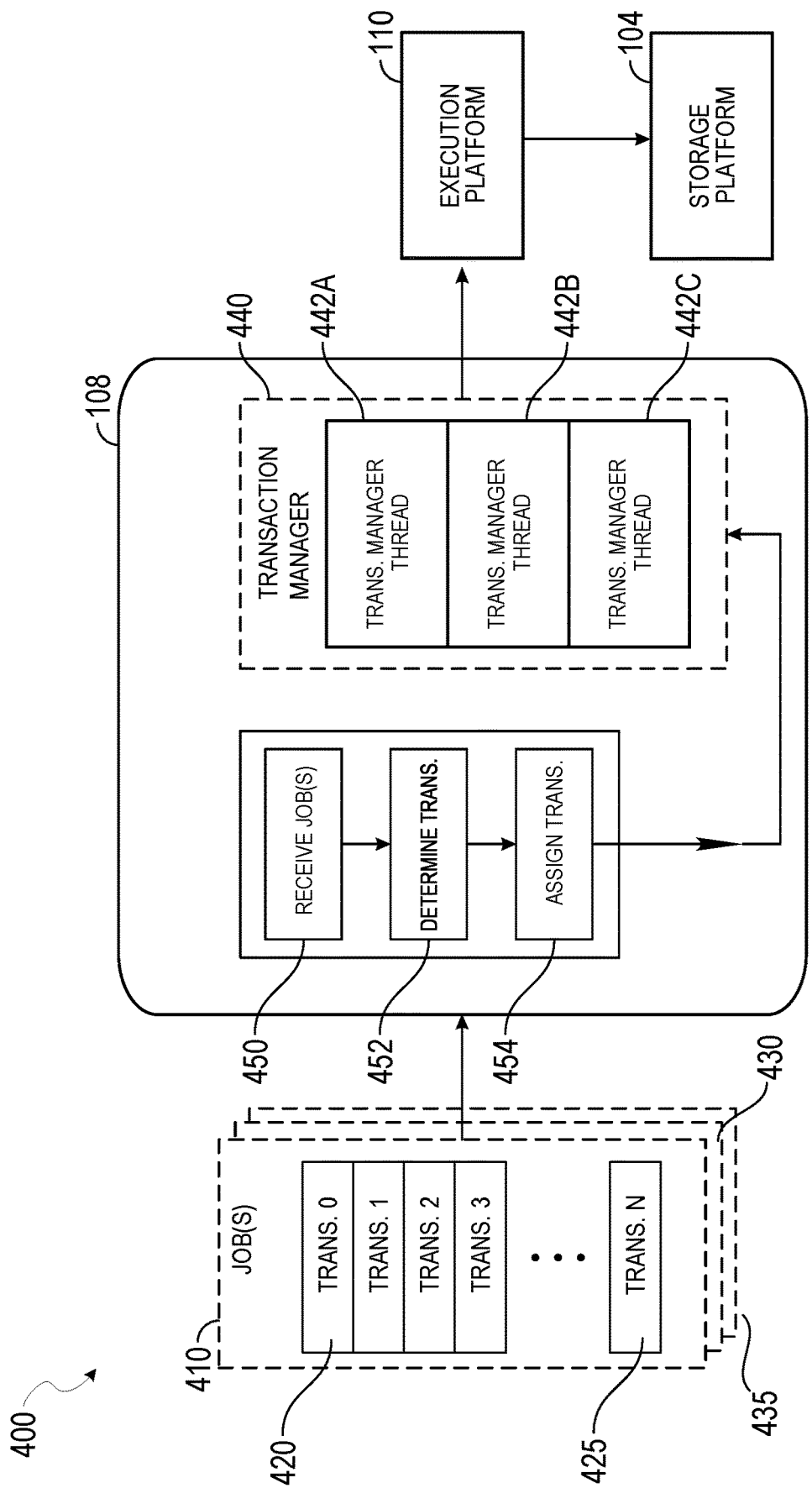
FIG. 4A is a computing environment conceptually illustrating an example software architecture for managing and executing concurrent transactions on a database system, which can be performed by a given execution node of the execution platform, in accordance with some embodiments of the present disclosure.

FIG. 4A is a computing environment 400 conceptually illustrating an example software architecture for managing and executing concurrent transactions on a database system (e.g., the network-based database system 102), which can be performed by a given execution node of the execution platform 110, in accordance with some embodiments of the present disclosure. In an embodiment, a process flow is performed by a transaction manager that is configured to manage and execute transactions as described further herein.

As shown, the transaction manager 440 is included in the compute service manager 108. The transaction manager 440 receives a job 410 that may be divided into one or more discrete transactions 420-425, e.g., transaction 0, transaction 1, transaction 2, transaction 3, and so forth through transaction (n). In an embodiment, each transaction includes one or more tasks or operations (e.g., read operation, write operation, database statement, user defined function, and the like) to perform. The transaction manager 440 receives the job at 450 and determines transactions at 452 that may be carried out to execute the job 410. The transaction manager 440 is configured to determine the one or more discrete transactions, such as transaction 0, transaction 1, transaction 2, transaction 3, and so forth, based on applicable rules and/or parameters. The transaction manager 440 assigns transactions at 454.

As further shown, the transaction manager 440 is configured to concurrently process multiple jobs that can be performed by the execution platform 110. In an example, the transaction manager 440 can receive a second job 430 or a third job 435, each of which include respective discrete transactions that are to be performed on the execution platform 110. Each of the transactions may be executed concurrently by the execution platform 110 in which different operations are performed (e.g., a respective read operation or write operation are executed from each of the transactions by the execution platform 110).

In an implementation, the job 410, including the respective transactions therein, is carried out by the transaction manager 440 which can perform the responsibilities of a query manager (e.g., processing query statements and operations, and the like). As shown, the transaction manager 440 may have multiple threads, including, for example, transaction manager threads 442a, 442b, 442c, and so forth. The transaction manager 440 may assign the job 410, including the multiple discrete transactions, to a particular virtual warehouse of the execution platform 110. Based on this assignment, the transaction manager 440 can send the job 410, including the multiple discrete transactions, to the assigned virtual warehouse for execution. Alternatively, the transaction manager 440 can send a subset of the transactions included in the job 410 for execution by the execution platform 110.

In an embodiment, as described further herein, the transaction manager 440 can perform operations to process transactions (e.g., OLTP) that may be executing concurrently, while handling conflicts and avoiding starvation of resources. Further, as described further herein, the transaction manager 440 handles conflicts between multiple transactions and concurrency issues that can arise when multiple transactions are executing in parallel on the execution platform 110. As further shown, the execution platform 110 communicates with the storage platform 104, which provides a distributed database (e.g., FoundationDB, and the like), where data can be read and written in connection with performing the transactions.

In an embodiment, the transaction manager 440 schedules and manages the execution of transactions on behalf of a client account. The transaction manager 440 may schedule any arbitrary SQL query included in a given transaction. The transaction manager 440 may assume a role to schedule the job 410 as if it is the client account rather than as an internal account or other special account. The transaction manager 440 may embody the role of, for example, an account administrator or a role having the (smallest) scope necessary to complete the job 410. In an embodiment, the transaction manager 440 embodies the role that owns the object that is the target of the job 410 (e.g. for a cluster, the table being clustered is the target).

In an embodiment, the transaction manager 440 determines transactions at 452 and assigns transactions at 454 that must be performed to fully execute the job 410. In an embodiment, the transaction manager 440 assigns ordering constraints to any number of the one or more discrete transactions, where applicable. Depending on the constraints of the job 410, the transaction manager 440 may determine that one or more of multiple discrete transactions must be serialized and executed in a particular order.

In an embodiment, the transaction manager 440 generates a report indicating when the job 410 is scheduled to be executed and how much computing resources are estimated to be tied up executing the job 410. The transaction manager 440 may alert a client account when the job 410 is being executed.

Figure 4B:
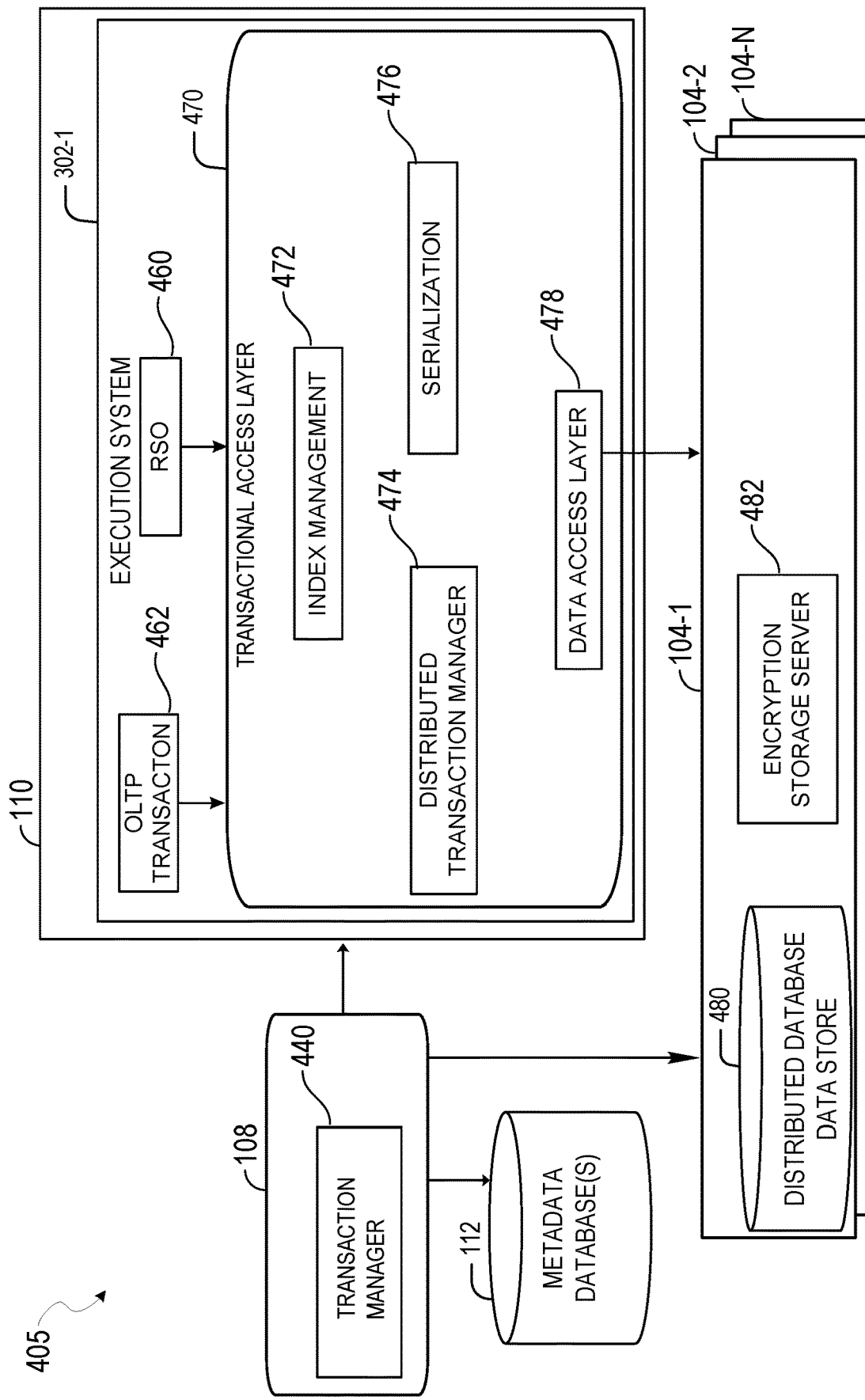
FIG. 4B is a computing environment conceptually illustrating an example software architecture for managing and executing concurrent transactions across a distributed database, which can be performed by a given execution node of the execution platform, in accordance with some embodiments of the present disclosure.

FIG. 4B is a computing environment 405 conceptually illustrating an example software architecture for managing and executing concurrent transactions on a database system (e.g., the network-based database system 102), which can be performed by a given execution node of the execution platform 110, in accordance with some embodiments of the present disclosure. Computing environment 405 is similar to the computing environment 400 discussed above in FIG. 4A and now includes additional components in execution platform 104 and storage platform 104 that will be discussed in more detail below. In particular, the additional components relate to a transactional access layer for processing operations such as rowset operators (RSOs).

As shown, computing environment 405 includes the transaction manager 440 as included in the compute service manager 108, and different states of transactions are stored in metadata database 112, which was discussed before. Some components shown in computing environment 405 that were discussed before are not further discussed in great detail to maintain the clarity and focus of the discussion of FIG. 4B.

In the example of FIG. 4B, RSO 460 and OLTP transaction 462 are received by transactional access layer 470 for processing, which in an implementation can be understood as an OLTP data layer providing various access methods for accessing and modifying OLTP tables. In an example, transactional access layer 470 can provide an interface used to execute RSOs and OLTP transactions that centralizes index management (e.g., provided by index management component 472), constraint checking, trigger processing, and the like. Given a schema and an intended modification, the transactional access layer 470 can instruct a distributed transaction manager 474 to perform read and write operations, and also the additional write operations required by index maintenance (e.g., performed by index management component 472) or read operations required for constraint verification.

In an implementation, RSOs operate using column-oriented rowsets, and distributed transaction manager 474 operates using row-oriented key-value pairs. As also shown, serialization component 476 translates between these two representations (e.g., column-oriented and row-oriented).

In an embodiment, distributed transaction manager 474 implements a transactional layer providing a read committed (e.g., transaction isolation level) for distributed database data store 480 (e.g., corresponding to a FoundationDB instance). In this example, the read committed isolation level can require aborting on write-write conflicts, which is handled by starting the query with a newer read timestamp while holding the previously taken write locks.

In embodiment, an API is provided to be used within an RSO (or OLTP transaction) for accessing and operating with distributed transaction manager 474. In an embodiment, distributed transaction manager 474 is a long-lived process that maintains a cache of transaction status results and performs background deadlock detection or cleanup work.

In an implementation, distributed transaction manager 474 is a transactional layer that could be used with any underlying distributed, linearizable key-value store. For example, distributed database data store 480 is implemented as an FoundationDB cluster storing OLTP tables. In an example, a single OLTP cluster is provided for each account, and in another example the OLTP tables of an account may reside in multiple clusters. Each cluster can be provided in different storage platforms (e.g., storage platform 104-1, storage platform 104-2, or storage platform 104-N), and in other instances multiple clusters can be provided in a single storage platform (e.g., storage platform 104-1).

As also shown, data access layer 478 is responsible for interacting with distributed database clusters (e.g., provided in cloud storage platform 104-1, cloud storage platform 104-2, and cloud storage platform 104-N) in order to perform efficiently and reliably read and write operations. In an embodiment, data access layer 478 is agnostic of database concepts (e.g., tuples, transactions, columns, tables, and the like).

As further shown, storage platform 104-1 includes distributed database data store 480 and encryption storage server 482. In embodiments described further herein, encrypted data (e.g. encrypted node data for a B+ tree structure, and the like) may be stored in distributed database data store 480 using encryption storage server 482. A further discussion of these components in additional detail is provided in FIG. 8 below.

As discussed further herein, the subject technology provides concurrency control and isolation for executing transactions (e.g., a series of SQL Statements within a SQL Transaction) against linearizable storage (e.g., a linearizable key-value store). A transaction as referred to herein includes a group of operations executed atomically. In an example, such transactions may include read and write operations but can also include operations such as increment, decrement, compare-and-swap, and the like. Further, it is appreciated that linearizable storage may include any type of distributed database (e.g., Apache HBase).

The following discussion relates to transactions in a given distributed database system. In an example, the transaction manager 440 utilizes a linearizable storage, provided by the cloud storage platform 104-1, for managing and processing transactions as described herein. In an embodiment, the transaction manager 440 implements a read committed model for performing transactions. As referred to herein, a read committed model can refer to a model that ensures that all read operations performed in a given transaction sees a consistent snapshot of the database (e.g., reading a last set of committed values that existed when the read operation commenced), and the transaction itself successfully commits only if no updates that the transaction has made results in write-write conflicts with any concurrent transactions.

As discussed further herein, the transaction manager 440 implements a two-level transaction hierarchy, where a top-level transaction corresponds to a SQL transaction, and a nested transaction corresponds to a SQL statement within the parent SQL transaction. A given nested transaction can perform operations, such as reads and writes, and can perform a rollback and restart execution zero or more times before succeeding. Upon transaction commit, write operations can become visible, and write locks held by each contained statement can be released.

As mentioned before, the subject system provides concurrency control and isolation for executing a series of SQL Statements within a SQL Transaction against a linearizable storage. As discussed further herein, a transaction manager (e.g., transaction manager 440) is configured to provide a concurrency control mechanism that can be understood as a combination of multi-version concurrency control for read operations (MVCC) and locking for write operations. The subject system provides techniques for read committed isolation where each statement may execute against a different snapshot of the database (e.g., the storage platform 104), with write locks held until transaction commit.

In an embodiment, the linearizable storage as described herein enables each operation to execute atomically between invocation and response. As an example, such a linearizable key-value store ensures that operations execute in an atomic manner consistent with a "real-time" ordering of those operations e.g., when operation A completes before operation B begins, operation B should take effect after operation A. In the context of a database, a first write operation to a row in the table must take effect before a second write or read operation to the same row in the table if the second operation was issued after the first completed.

The examples described herein relate to linearizable storage such as a linearizable database, including, for example, NoSQL systems, and the like. A given NoSQL database refers to a database that stores data in a format other than a tabular format, and can store data differently than in relational tables. Further, Uber's Schemaless is an example of building linearizable Key-Value storage via having a "key" and "value" column in a relational table. Other examples of linearizable databases are: HBase, RocksDB, TiKV, Redis, Etcd.

Some examples of optimizations provided by the subject system include utilizing restricted transactional capabilities offered by some embodiments of cloud storage platform 104-1, such as FoundationDB, that can be leveraged to enable a more efficient transaction implementation. For example, in a write(/lock/delete) protocol, a write operation is performed, and then a read operation is done to check for (1) any write operation that happened before the write request was submitted (2) any other write operation was submitted concurrently with the write operation that was serialized before. The following example illustrates the above:

T1 starts statement S1
S1 starts a FoundationDB Transaction, and uses its Read Version as the Read Timestamp
S1 wishes to write object X, so it first reads object X as of the Read Timestamp
Finding no conflicts, S1 writes X, using a timestamped operation to embed the commit timestamp in the key and setting IsCommitEmbedded.
S1 sets a read conflict range on the FoundationDB transaction for all keys with a prefix of X
S1 writes a transaction status entry for ID, directly setting it to committed.
T1 commits the FoundationDB Transaction.
If the transaction commits, then there were no concurrent conflicting transactions.
If the transaction is aborted, then there was a concurrency conflicting transaction for one of the writes that were done. None of S1's writes, nor the transaction status entry will be persisted. S1 must now restart in the slow path.

In an example, a "read version" refers to a "version" or state of the database that corresponds to when a last operation was successfully committed to the database.

The following relates to a discussion of strict serializability. Whereas linearizability makes a "real-time" ordering and atomicity promise about single operations, strict serializability makes a "real-time" ordering and atomicity promise about groups of operations. In an example, the group of operations is submitted incrementally over time, with a terminal "commit" command being issued. The strictly serializable storage platform may employ techniques such as pessimistic lock-based exclusion or an optimistic validation phase to enable this functionality. In this example, the group of operations is referred to as a transaction as mentioned herein. The subject system can impose restrictions on the transaction, such as the number, size, or duration of the operations, and always reject transactions that exceed these limits.

In an embodiment, read operations may be optimized in the following manner. When reading with a given read timestamp, it may not be feasible for any transaction started after the read timestamp to commit before the read timestamp. Thus, if the Transaction ID is set to be the same as the first statement's read timestamp, then instead of reading [X.0, X.inf], the subject system can read [X.0, X.readTimestamp]. Consequently, this approach can make read operations for old or frequently written data more efficient.

In an embodiment, the subject system implements a two-level transaction hierarchy, where the top-level transaction corresponds to a SQL Transaction, and the nested transaction (referred to as a "StatementContext") corresponds to a SQL statement within the parent SQL Transaction. A given StatementContext object performs read and write operations and may be instructed to perform a rollback and restart execution zero or more times before succeeding. In an example, transactions control the collective visibility of all write operations from successful statements. Upon transaction commit, all write operations become visible, and all write locks held by each contained statement are released.

In an embodiment, each object key is associated with a stamp that uniquely identifies a single execution attempt of a statement, which can be by appending a three-part tuple of (Transaction ID, statementNumber, restartCount). The higher order component is the transaction identifier assigned to the SQL-level transaction. The statementNumber identifies the SQL statement within the SQL-level BEGIN/COMMIT block. The restart count tracks which statement restart attempt generated this write operations. A StatementContext object is instantiated with this stamp, and applies it to all writes performed through the StatementContext instance.

Stamping keys this way has a number of desirable properties. First, if key1<key2, then key1.suffix1<key2.suffix2, regardless of the values of suffix1 and suffix2. If key1==key2, then the transactionID component of the suffix allows us to resolve the commit status of the object to determine its visibility to the statement. If transactionID1==transactionID2, then Statement Number allows statements to see writes performed by previous statements within the same transaction. The restartCount component of the suffix enables the system to detect and delete obsolete versions of the object that had been left around when a statement has to be restarted.

In a similar fashion each execution of a statement is given a three-part identifier consisting of the statement's readTimestamp (RTS) and the current values of statementNumber (SN) and restartCount (RC). This approach ensures that each statement that is part of the execution of a SQL statement (or more generally a SQL Transaction), sees either data committed before the SQL statement started or by data written or updated by the transaction itself.

In an embodiment, the transaction manager 440 employs a Transaction Status Table (TST) to keep track of committed and aborted transactions. The TST is a persistent hashmap that maps Transaction ID to its metadata, most notably a list of finalized statement numbers and their final restart count, and the commit outcome including the transaction's commit timestamp (CTS). Transactions that are in progress do not exist in the Transaction Status Table. In an embodiment, the TST can be stored in the cloud storage platform 104-1, or within memory or cache of the execution platform 110.

The following discussion relates to a read protocol that is utilized by the transaction manager 440.

In an embodiment, the transaction manager 440 uses a read committed transaction isolation level, and each statement may be run with a different read timestamp. In an example, the read request for a given key (or a range of keys) is implemented by executing a linearizable storage read call for all keys with X as their prefix. The call returns versions of X with their stamps and values. The read method returns either the latest version of X made by a transaction that committed before the SQL statement started or which was written by an the most recent statement of the transaction itself that was not canceled (if any).

The following discussion relates to a write protocol that is utilized by the transaction manager 440.

In an embodiment, the write protocol checks both for WW (write-write) conflicts and WW deadlocks. The following example describes a single transaction and no conflicts. Assume that object X initially has a stamp of TXN1.0.0 and was committed at timestamp 10. In the following example, it should be understood that the following transactional steps described further below can be done within one transaction, and collectively committed. On failure, or upon exceeding the limitations of the underlying transactional system, the execution can fall back to issuing the operations individually as described in further detail below.

T2 starts and creates S1 of StatementContext(ID=TXN2, Statement Number=1, restartCount=0)

Assume that the constructor obtains a read timestamp from the linearizable storage of 15 by contacting the clock service 130. As mentioned before, the clock service 130 is a component of the cloud storage platform 104-1 which can be contacted to fetch a number that will be greater than any number previously returned, such as one that correlates to the current time. In an embodiment, clock service 130 is provided separately and is independently contactable from the linearizable storage, or can be integrated into the linearizable storage such that the clock value may be inserted into a written value. The latter operation will be referred to as a timestamped write.

To update value of X, the following sequence of actions is performed in an embodiment:
{
S1 does a linearizable storage write for X.TXN2.1.0 with a value of 100
//The next step is for S1 to check for WW (write-write) conflicts by checking whether there is
//another transaction that has updated X between the RTS and S1's write. S1 issues the range read [X.0, X.inf] to obtain the set all versions of X and their stamps
The read returns [X.TXN1.0.0, X.TXN2.1.0].
S1 looks up TXN1 in the Transaction Status Table, finds a commit timestamp of 10.
10 is earlier than our read timestamp of 15, so it is not a conflict.
S1 ignores [X.TXN2.1.0] as it belongs to S1
//Assume for now, there were no conflicts detected
S1 finalizes, and records (statement number=1, restart count=0) into the transaction
status table for TXN2
}
T2 commits. This will cause the Transaction Status Table record to be updated in linearizable storage to reflect that TXN2 is now committed and its commit timestamp of 20.

At this point there will be two versions of X, one stamped with TXN1.0.0 and the other TXN2.1.0. Subsequent transactions that read X can determine if this new version of X was written by a committed transaction by reading the transaction status record, and determine the CTS of the transaction.

The write protocol for transaction T can now be stated.

In an implementation, each row (object) updated requires two separate linearizable storage transactions:
1) The first linearizable storage transaction of T inserts a new version of the object with its key X suffixed with three-part suffix (T.ID, T.statementNumber, T.restartCount).
2) The second linearizable storage transaction issues a range read with the prefix "X." to obtain the SCT (set of conflicting transactions). The result set is a list of committed or active transactions that wrote (or are writing) new versions of X.

There are a number of possible distinct outcomes to this linearizable storage read call that are evaluated in the following order:
1) SCT is empty in which case T is trivially allowed to proceed.
2) SCT is not empty, but for all Ti in SCT, Ti has committed before T's read timestamp, and thus are not WW (write-write) conflicts. T may proceed.
3) SCT is not empty; for all Ti in SCT, Ti is committed; and there exists a Ti in SCT, such that its CTN is greater than T's read timestamp. T is permitted to restart without delay.
4) SCT is not empty, and for one or more Ti in SCT, Ti has not yet committed or aborted. T must wait for all transactions in SCT to complete before restarting the current statement.
5) SCT is not empty, and for one or more Ti in SCT, Ti.TransactionID is the same as our own transaction ID, and Ti.StatementCount is less than our current statement count. This means that currently the lock is held, as a previous statement took it and successfully finished its execution. T may proceed.
6) SCT is not empty, and for one or more Ti in SCT, TI.TransactionID is the same as our own transaction ID, Ti.StatementCount is the same as our own StatementCount, and Ti.RestartCount is less than our own restart count. This is a lock from a previous execution of our own transaction, thus T holds the lock on this row, and T may proceed.

For all cases, the object (X.Stamp, Value) will be left in the database (e.g., the cloud storage platform 104-1). For (3) and (4) which require restarts, the object is left to serve as a write lock. In general, all tentative writes for an object X will form a queue of write locks. (5) and (6) illustrate the cases where previously left write locks allow subsequent statements or restarts of a statement to recognize that they already hold the lock that they wish to take.

The following discussion describes an example that illustrates a write-write (WW) conflict. A write-write conflict, which is also understood as overwriting uncommitted data, refers to a computational anomaly associated with interleaved execution of transactions. To simplify the example, stamps are omitted. Assume that before either T1 or T2 starts that object X has a value of 500, a stamp of TXN1.0.0, and a CTN of 10.

T1 starts and gets a read timestamp of 15
T2 starts and gets a read timestamp of 20
T2 writes (key=X.T2, value=100)
T2 issues a linearizable storage read with range [X.0, X. Inf]. The set SCT will be empty so T2 continues
T1 writes (key=X.T1, value=50)

T1 issues a linearizable storage read with range [X.0, X. Inf]. The set SCT will contain T2 so T1 must restart T2 successfully commits. T1's CTN for X will be >20. Assume it is 21

After waiting until T2 either commits or aborts, T1 restarts the statement with a read TS>21.

The following discussion relates to a delete protocol utilized by the transaction manager 440.

In an embodiment, delete operations are implemented as a write of a sentinel tombstone value; otherwise, delete operations employ the same protocol as write operations. When a read operation determines that the most recently committed key is a tombstone, it considers that key to be non-existent.

The following discussion relates to a lock protocol utilized by the transaction manager 440.

To support a query statement of SELECT . . . FOR UPDATE, the transaction manager API offers StatementContext::lock(Key), which allows rows to be locked without writing a value to them. The implementation of lock( ) follows the write protocol, except that it writes a special sentinel value to indicate the absence of a value (distinct from SQL NULL). A SELECT . . . FOR UPDATE statement may also be forced to restart several times before the statement finishes successfully. Once it does, subsequent statements in the transaction will recognize the existence of this key as an indication that they hold the lock (in accordance with cases (5) and (6) above). All reads can ignore the key as a write.

The following discussion relates to determining whether to commit, abort, or restart a given transaction which can be determined by the transaction manager 440.

When a transaction finishes its execution, it will either have an empty SCT, indicating that the commit can proceed, or an SCT with one or more conflicting transactions, indicating that the transaction will need to restart.

When a statement is restarted, all writes stamped with a lower restartCount are left in the database (e.g., the cloud storage platform 104-1) as provisional write locks for the next execution. The next execution of the statement might write a different set of keys. The set difference between the first and second execution form a set of orphaned writes that must be removed and never become visible. The statement itself may not be relied upon to always be able to clean up its own orphaned writes, as in the event of a process crash, the location of the previous writes will have been forgotten. Finalizing statements and recording the restart count of the successful execution promises that only the results of one execution will ever become visible, and permits orphaned writes to be lazily cleaned up.

A transaction is committed, and all of its writes made visible, by inserting its Transaction ID into the Transaction Status Table. The commit timestamp is filled in by the clock service 130 or directly by the distributed database (e.g., FoundationDB), such that it is higher than any previously assigned read or commit timestamps. All writes must have completed before a statement may be finalized, and all statements must be finalized before the transaction may be committed.

A transaction is aborted by inserting its Transaction ID into the Transaction Status Table, with its transaction outcome set as aborted. The list of finalized statements and their restart counts will be reset to an empty list. The insertion into the Transaction Status Table will make the abort outcome visible to all conflicting transactions, and all writes performed by finalized statements may be proactively or lazily removed from the database (e.g., the cloud storage platform 104-1).

When a statement tries to finalize with a non-empty SCT, it waits for commit outcomes to be persisted to the Transaction Status Table for all conflicting transactions. Once all conflicting transactions have committed or aborted, then the transaction will begin its restart attempt.

The following discussion relates to an API (e.g., the transaction manager API as referred to below) that can be utilized (e.g., by a given client device) to send commands and requests to the transaction manager 440.

A SQL transaction contains a sequence of one or more SQL statements. Each SQL statement is executed as a nested transaction, as implemented by the transaction manager StatementContext class. Each transaction manager statement itself is executed as one or more database transactions.

In an embodiment, the transaction manager API is divided into two parts: 1) the data layer, which provides a read and write API to the transaction execution processes; and 2) the transaction layer, which provides, to the compute service manager 108, an API to orchestrate the transaction lifecycle. In an implementation, transactions operate at a READ COMMITTED isolation level and implement MVCC on top of the distributed database (e.g., cloud storage platform 104-1) to avoid taking any read locks.

Consider the following example SQL query:

Update emp.Salary=emp.Salary*1.1 where emp.Dept="shoe";

In an example, an instance of the StatementContext class will be created to execute this SQL statement. The constructor contacts the linearizable storage transaction manager to begin a linearizable storage transaction and obtain a linearizable storage STN which is then stored in the readTimestamp variable.

The Update operation then executes across any number of execution nodes, all using the same StatementContext instance. In an example, a function rangeRead( ) will be used to scan the base table, or an index on Dept, for the tuples to update. A series of write( ) calls will be made to update the salary of all matching employees.

A call to finalize( ) will return CONFLICT if the statement encountered any conflicts during its execution, to indicate that re-execution is needed. The key to restarts making progress is that the first execution of the statement will have the side effect of, in effect, setting write locks on the objects being updated. This ensures that when the statement is re-executed the necessary writes locks have already been obtained and the statement will generally (but not always).

Next, consider an example illustrating Write-Write conflicts between 3 transactions:

T1 starts S1 with timestamp 10
T2 starts S2 with timestamp 20
T3 starts S3 with timestamp 30
S1 writes X
S2 writes Y
S3 writes Z
S1 writes Y, and notes the conflict with T2
S2 writes Z, and notes the conflict with T3
S3 writes X, and notes the conflict with T1

In this case described above, three transactions are involved in a deadlock. Each statement believes that it must restart and wait for the execution of the previous transaction to finish. No transaction has the complete information to know that it is involved in a deadlock.

Thus, when a statement fails to finalize due to conflicts, it instead writes its conflict set into the database (e.g., the cloud storage platform 104-1). These conflict sets may be read by all other transactions, allowing them to detect a cycle in the waits-for graph, indicating that they're involved in a deadlock.

Figure 5:
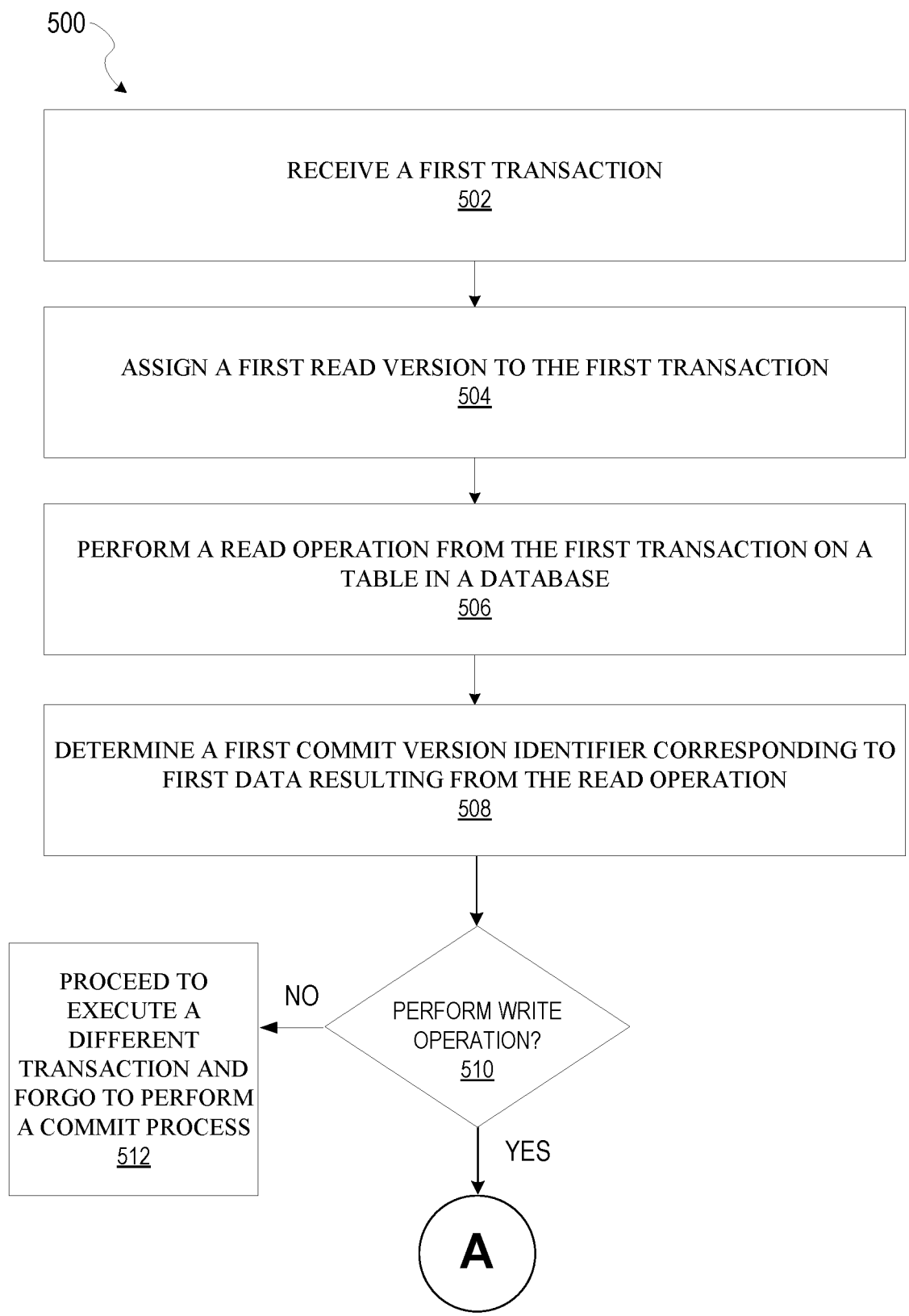
FIG. 5 is a flow diagram illustrating operations of a database system in performing a method, in accordance with some embodiments of the present disclosure.

FIG. 5 is a flow diagram illustrating operations of a database system in performing a method, in accordance with some embodiments of the present disclosure. The method 500 may be embodied in computer-readable instructions for execution by one or more hardware components (e.g., one or more processors) such that the operations of the method 500 may be performed by components of network-based database system 102, such as components of the compute service manager 108 or a node in the execution platform 110. Accordingly, the method 500 is described below, by way of example with reference thereto. However, it shall be appreciated that the method 500 may be deployed on various other hardware configurations and is not intended to be limited to deployment within the network-based database system 102.

At operation 502, the transaction manager 440 receives a first transaction, the first transaction to be executed on linearizable storage.

At operation 504, the transaction manager 440 assigns a first read version to the first transaction, the first read version indicating a first version of the linearizable storage. Alternatively, a read timestamp can be retrieved from a clock service (e.g., the clock service 130), and a transaction identifier can be assigned to the first transaction where the transaction identifier corresponds to a read start time.

At operation 506, the transaction manager 440 performs a read operation from the first transaction on a table in a database.

At operation 508, the transaction manager 440 determines a first commit version identifier corresponding to first data resulting from the read operation.

At operation 510, the transaction manager 440 determines whether a particular write operation is included in the first transaction. If the particular write operation is to be performed with the first transaction, then the transaction manager 440 proceeds to perform a method as described below in FIG. 7.

Alternatively, when the transaction manager 440 determines that a particular write operation is absent from the first transaction, at operation 512, the transaction manager 440 proceeds to execute a different transaction (along with foregoing to perform a commit process for the first transaction), which is described, in an example, in FIG. 6 below. It is appreciated that due to the concurrency of transactions that are performed, the operations described further below in FIG. 6 can be executed at any time during the operations described in FIG. 5 above.

Figure 6:
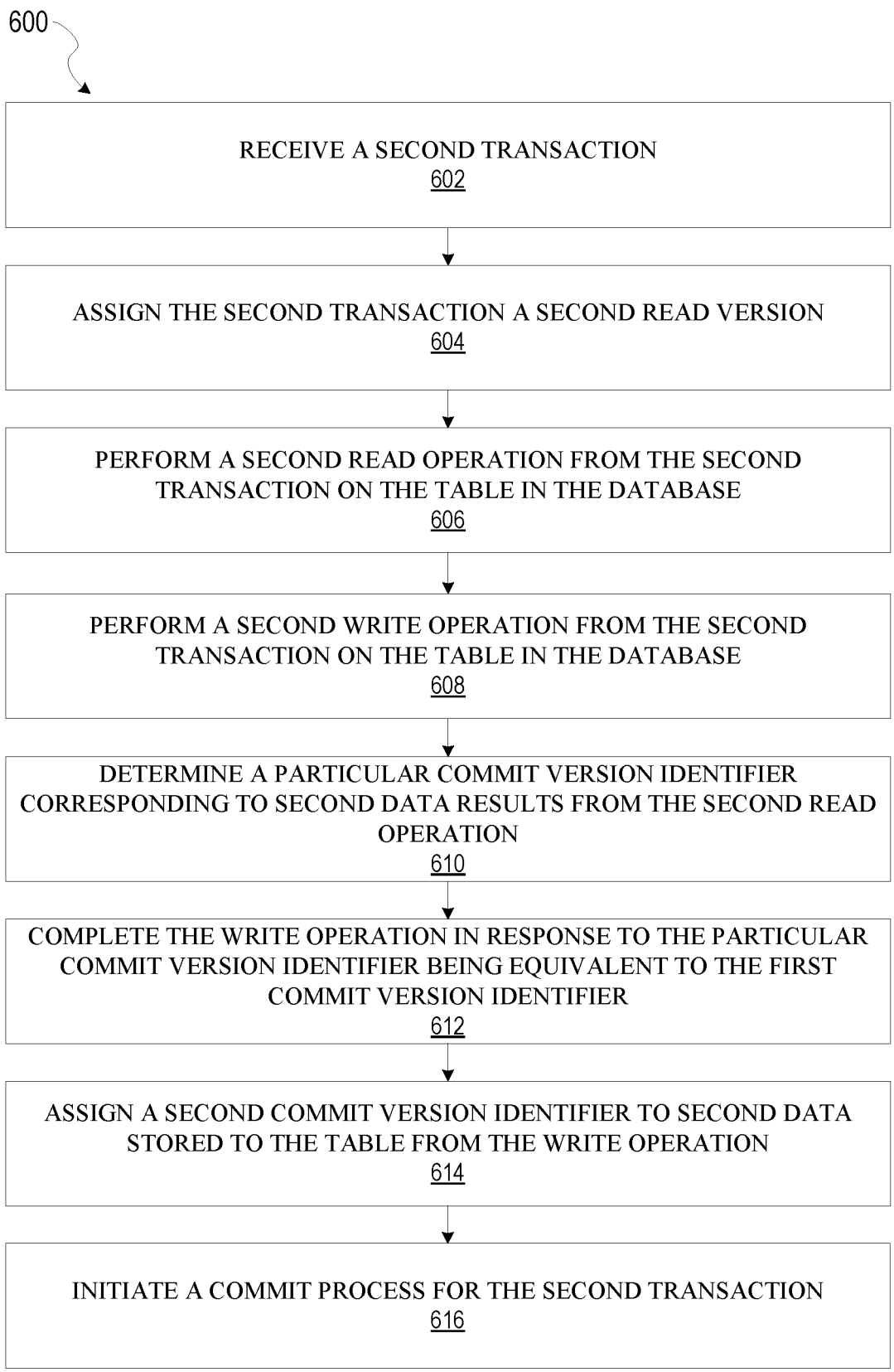
FIG. 6 is a flow diagram illustrating operations of a database system in performing a method, in accordance with some embodiments of the present disclosure.

FIG. 6 is flow diagram illustrating operations of a database system in performing a method, in accordance with some embodiments of the present disclosure. The method 600 may be embodied in computer-readable instructions for execution by one or more hardware components (e.g., one or more processors) such that the operations of the method 600 may be performed by components of network-based database system 102, such as components of the compute service manager 108 or a node in the execution platform 110. Accordingly, the method 600 is described below, by way of example with reference thereto. However, it shall be appreciated that the method 600 may be deployed on various other hardware configurations and is not intended to be limited to deployment within the network-based database system 102.

In some embodiments, the method 600 can be performed in conjunction with the method 500 as discussed above. For example, the method 600 can be performed after the operations of the method 500 or performed substantially concurrently with the method 500.

At operation 602, the transaction manager 440 receives a second transaction, the second transaction to be executed on linearizable storage.

At operation 604, the transaction manager 440 assigns the second transaction a second read version, the second read version indicating a second version of the linearizable storage.

At operation 606, the transaction manager 440 performs a second read operation from the second transaction on the table in the database.

At operation 608, the transaction manager 440 performs a second write operation from the second transaction on the table in the database.

At operation 610, the transaction manager 440 determines a particular commit version identifier corresponding to second data results from the second read operation.

At operation 612, the transaction manager 440 completes the write operation in response to the particular commit version identifier being equivalent to the first commit version identifier.

At operation 614, the transaction manager 440 assigns a second commit version identifier to second data stored to the table from the write operation, the second commit version identifier corresponding to a second version of data in the table, the second commit version identifier different than the first commit version identifier.

At operation 616, the transaction manager 440 initiates a commit process for the second transaction.

Figure 7:
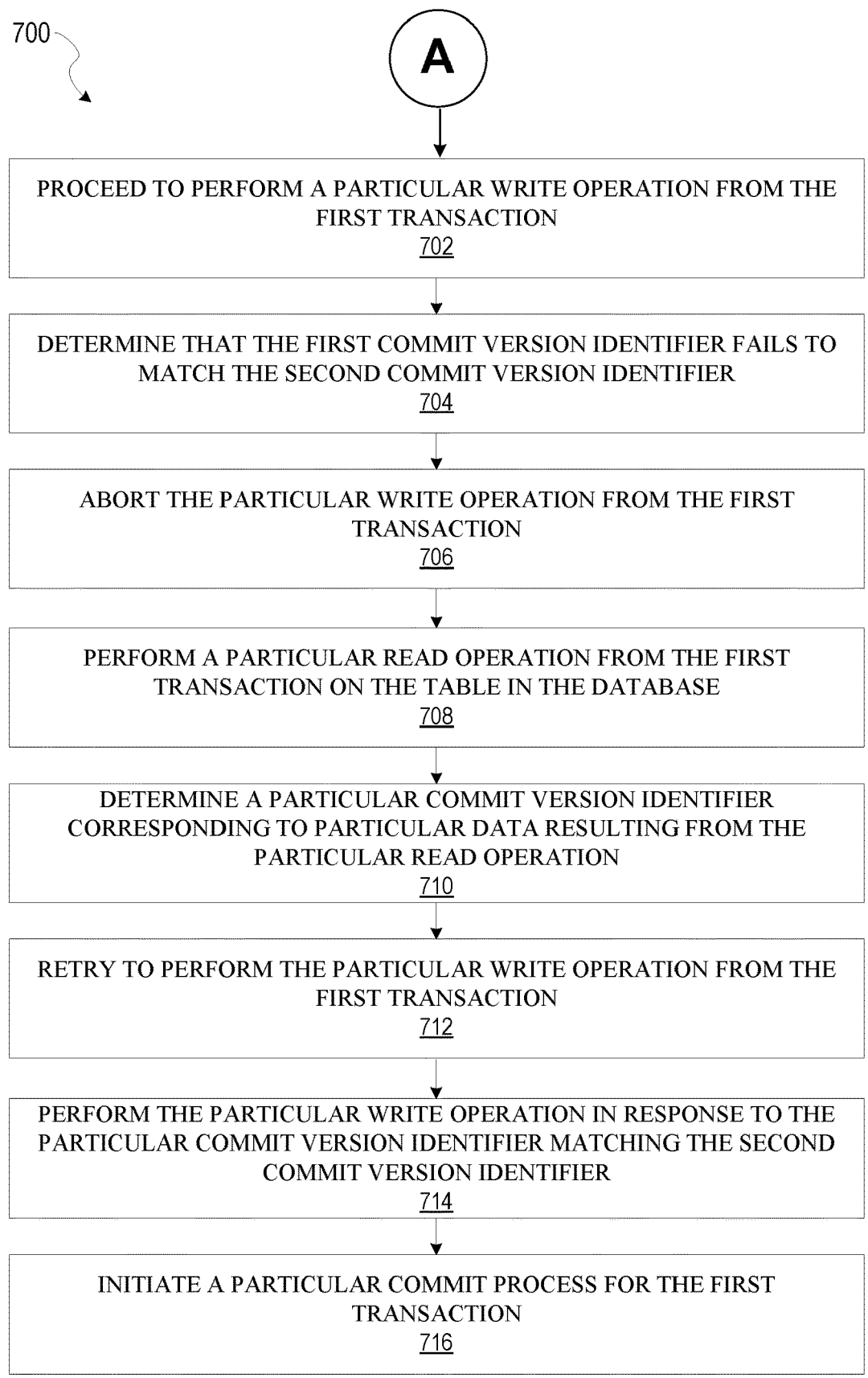
FIG. 7 is a flow diagram illustrating operations of a database system in performing a method, in accordance with some embodiments of the present disclosure.

FIG. 7 is a flow diagram illustrating operations of a database system in performing a method, in accordance with some embodiments of the present disclosure. The method 700 may be embodied in computer-readable instructions for execution by one or more hardware components (e.g., one or more processors) such that the operations of the method 700 may be performed by components of network-based database system 102, such as components of the compute service manager 108 or a node in the execution platform 110. Accordingly, the method 700 is described below, by way of example with reference thereto. However, it shall be appreciated that the method 700 may be deployed on various other hardware configurations and is not intended to be limited to deployment within the network-based database system 102.

In some embodiments, the method 700 can be performed in conjunction with the method 500 and the method 600 as discussed above. For example, the method 700 can be performed after the operations of the method 500 or the method 600 (or performed substantially concurrently therewith either method).

At operation 702, the transaction manager 440 proceeds to perform a particular write operation from the first transaction.

At operation 704, the transaction manager 440 determines that the first commit version identifier fails to match the second commit version identifier.

At operation 706, the transaction manager 440 aborts the particular write operation from the first transaction.

At operation 708, the transaction manager 440 performs a particular read operation from the first transaction on the table in the database.

At operation 710, the transaction manager 440 determines a particular commit version identifier corresponding to particular data resulting from the particular read operation.

At operation 712, the transaction manager 440 retry to perform the particular write operation from the first transaction.

At operation 714, the transaction manager 440 perform the particular write operation in response to the particular commit version identifier matching the second commit version identifier At operation 716, the transaction manager 440 initiates a particular commit process for the first transaction.

Embodiments of the subject technology, provide enterprise encryption data at-rest feature for hybrid tables where an encryption domain is defined as 'KeyPrefix' or also referred to as a "tenant" in some instance, and where a customer's OLTP database is represented as a unique database KeyPrefix. Moreover, embodiments described herein support per-tenant encryption for stored data in a distributed database.

As mentioned herein, a "tenant" generally refers to a set of workloads (or operations) for a user (or account) mapped to a single distributed database data store (e.g., distributed database data store 480). Tenants are understood as discrete namespaces in a distributed database instance (e.g., FoundationDB) that serve as transaction domains. Moreover, a tenant can also refer to a 'identifier' that maps to a 'prefix' within a distributed database cluster, and all operations within a tenant are implicitly bounded within a tenant-prefix. From an OLTP workload perspective, a tenant corresponds an OLTP database (e.g., distributed database data store 480) exposed to a customer (e.g., or account or entity including a set of users).

As mentioned herein, hybrid tables refer to tables stored on linearizable storage provided by a distributed database such as FoundationDB.

In examples described herein, OLTP table data includes two portions:
1. "Record Key" (RK). The field corresponds to the "primary key" inserted into distributed database by an execution node.
2. "Record Value" (RV). The field corresponds to the "value" inserted into distributed database by an execution node.

The following discussion relates to supporting per-tenant encryption for stored data of an encryption storage server (e.g., encryption storage server 482).

A node in an ordered B-Tree (or variants) has a well-defined logical key range for which the node or its children can contain user-defined key and/or value data. As referred to herein, "encryption domain" is a key range for which all contained data within the range shall be encrypted with an encryption key designated for use on data in the encryption domain.

As referred to herein, a B-tree is a self-balancing data structure that maintains sorted data and allows searches, sequential access, insertions, and deletions in logarithmic time, allowing for nodes with more than two children.

The key range boundaries for an encryption domain are not considered to be sensitive information, however, any key that resides between the endpoints of the range is considered sensitive and is encrypted with the encryption domain's encryption key.

Encryption is enforced within the B-Tree by choosing node boundaries and contents to ensure that for all nodes in the B-Tree one of the following is true:
1. The keys within a node are either exact encryption domain range boundaries or are outside the ranges of all encryption domains, so the node can be encrypted with a general purpose encryption Key or no encryption key at all.
2. All keys within the node reside within the boundaries of a single encryption domain's key range, so the node is encrypted using a valid encryption key for the encryption domain.

In addition to the above, for better physical separation, when building the B-Tree, the subject system ensures that all pages corresponding to a specific encryption domain forms a subtree in the B-Tree, which is indexed by the KeyPrefix (or "key prefix") of the encryption domain.

The subject systems applies the above approach such that each customer (e.g., user associated with an account) is a tenant and is assigned a tenant prefix which in turn defines an encryption domain for that customer. In an example, a tenant prefix refers to a system generated "unique database KeyPrefix" to identify a given tenant in a distributed database (e.g., FoundationDB).

Although a B-Tree is disused herein, it is understood that an LSM tree can be utilized instead (or in addition to) the B-Tree due to structural similarities between the trees.

The subject system as described in example implementations herein therefore provides strong per-tenant encryption guarantees in a multi-tenant storage system database engine. Further, isolation guarantees are provided by ensuring data for a given tenant is encrypted using encryption keys unique to that tenant, further, leak of a tenant's encryption keys does not compromise other tenants' data.

The following discussion relates to an encryption key model in accordance with embodiments of the subject technology.

In an example, OLTP encryption can use strong AES-256 CTR (counter) encryption mode with a hierarchical key model. Salient properties include at least the following:
1. HMAC SHA256 key hashing technique is used to derive encryption keys using a base encryption key and locally generated random number. The formula used is as follows:

$$DEK=HMAC\ SHA_{256}(BEK\|UID)$$

Where
DEK=Derived Encryption Key
BEK=Base Encryption key
UID=Host local random generated number
UID is an 8 byte host-local random number.
HMAC (hash-based message authentication code) is a type of message authentication code (MAC) involving at least a cryptographic hash function (e.g., SHA-256) and a secret cryptographic key (e.g., BEK).
2. An encryption key derived using the above formula is cached (in-memory) for a given period of time (e.g., 10 mins., and the like)
3. Initialization Vector (IV) selection is random, however, selection of a '0' value is permitted.

The following discussion relates to encryption keys utilized in embodiments of the subject technology.
1. Hierarchical Key Model: OLTP encryption key model provides three levels of keys: the root key, per-account master key and per-tenant master key. Hence, every tenant uses a separate encryption key to encrypt stored customer data. Such a hierarchical key-model provides robust security guarantees for the customer, especially given the subject system's multi-tenant deployment policy. Further, it provides better customer account isolation guarantees in an example.

2. Key Rotation: An encryption key goes through various stages in its lifecycle:
   a. Active: The key is actively used for encrypting and decrypting customer data.
   b. Retired: The key is no longer used for encrypting new customer data, however, can be used for decrypting already persisted customer data (serving reads).
   c. Destroyed: The key is no longer used for encrypting and/or decrypting customer data and is eligible for garbage collection.

An encryption key starts its life as an active key, the subject system's services would transition an active key→retired key periodically (e.g., every 30 days, and the like), this process is termed as Key-Rotation or key rotation. After rotating a key, all new data written to OLTP tables would use the new active encryption key, however, the retired key is still kept around to decrypt data written in the past.
3. Re-Keying: As mentioned in the above section, key-rotation doesn't update encryption characteristics of the data already persisted in the tables; the subject system's rekeying is the process to re-encrypt already persisted data using the latest available encryption key. The process transitions an expired key from the retired→destroyed state after re-key operation is completed on all table data blocks.

Figure 8:
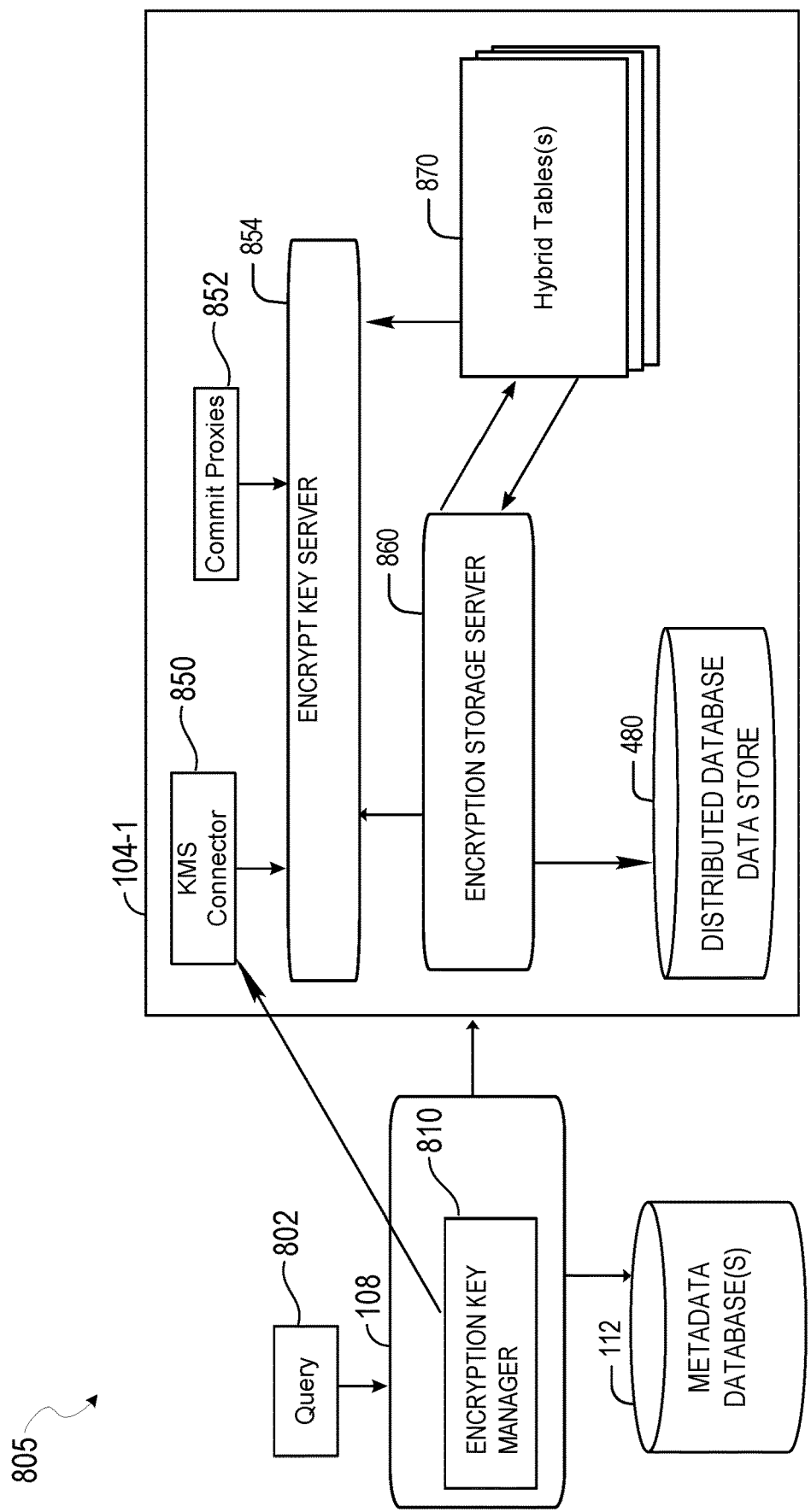
FIG. 8 is a computing environment conceptually illustrating an example software architecture for managing and providing encryption for multiple tenants using a distributed database, in accordance with some embodiments of the present disclosure.

FIG. 8 is a computing environment conceptually illustrating an example software architecture 805 for managing and providing encryption for multiple tenants using a distributed database, in accordance with some embodiments of the present disclosure.

As shown, a query 802 can be received by compute service manager 108. In an example, query 802 can represent an OLTP transaction to perform on a distributed database cluster corresponding to distributed database data store 480. The following discussion relates to how compute service manager 108 handles an OLTP write request to a table or an OLTP read request to a table (e.g., stored on distributed database data store 480).

OLTP Table Write Request
1. The compute service manager 108 receives a customer request, and performs query compilation and query plan generation, the query then gets submitted to an execution node (e.g., execution node 302-1). The execution node transforms the data into {RK, RV} format and inserts tuples into the distributed database (e.g., distributed database data store 480) as plaintext (e.g., unencrypted information).
2. The distributed database as part of request processing encrypts the tuple {RK, RV} before persisting the data on a durable short/long term storage namely: transaction log, storage server, or hybrid tables in some embodiments.

OLTP Table Read Request
1. The compute service manager 108 receives a customer request, it does query compilation and plan generation, the query then gets submitted to an execution node. The execution node issues distributed database read requests to fetch the relevant data records.
2. The distributed database as part of processing the read request fetches the encrypted data blocks from the persistent storage, decrypts the data using an encryption key before passing the result (as plain text) back to the execution node.

The following discussion relates to compute service manager 108.

For OLTP workloads, compute service manager 108 provides a logical 'table' concept whereas an execution node and distributed database operate at Key-Value granularity. OLTP encryption leverages key management features available for OLAP. As shown, compute service manager 108 includes an encryption key manager 810 that is responsible for key lifecycle management and stores encryption keys into metadata database 112. Further, encryption key manager 810 uses metadata database 112 (distributed database cluster) as the persistent backing store. The key hierarchy for OLTP contains the following keys:

1. Root Key: System Master key (SMK) is top of the hierarchy and used to wrap all other system generated encryption keys.
2. Account Master Key: Per customer account encryption master key; hereafter referred to as AMK.
3. Hybrid Tenant Master Key: The encryption domain in distributed database matches "tenant" partition semantics. For every tenant in distributed database data store 480, compute service manager 108 creates HTMK which is then used for encrypting data stored by the tenant-managed OLTP tables. HTMK are stored in metadata database 112 encrypted using AMK.
4. Hybrid Cluster Master Key: Per data distributed database cluster master encryption key. HCMKs are stored in the metadata database 112 encrypted using SMK and stored under the account. It is used for following purpose:
   a. Encrypting distributed database meta data shared across all tenants; for instance: shardmap.

The following discussion relates to distributed database encryption.

In an implementation, the subject system inserts customer data e.g., plaintext {RK, RV} in a data distributed database cluster (e.g., storage platform 104-1) for persistence.

The following discussion relates to KMS (key management service) connector 850, which is included in storage platform 104-1.

In an implementation, KMS Connector 850 is a non-distributed database process running on a distributed database cluster (e.g., storage platform 104-1) that enables the distributed database cluster to interact with external encryption key management services such as encryption key manager 810 included in compute service manager 108. Examples features including at least the following:
   a) An external standalone process implementing REST server.
   b) Abstracts organization specific KMS integration details to implement a local/remote REST server.
   c) Ensure organization specific code is implemented outside the distributed database codebase.
   d) The process is launched and maintained via a distributed database monitor daemon. The process implements REST server handling following endpoint:
      1. GET—http://localhost/getEncryptionKey
   Define a single interface returning "encryption key string in plaintext" and accepting a JSON input which can be customized as needed:
   json_input_payload {
      "Version": int//version
      "KeyId": keyId//string—"tenantId"
   }
   Some benefits of the above approaches are:
   A. JSON input format is extensible (adding new fields is backward compatible).
   B. Cloud KMS "getPublicKey" API accepts "keyId" as a string, hence, API can be more easily integrated.

a. KMS connector 850 implements compute service manager 108 discovery and topology refresh mechanisms:
  i. a distributed database agent upon provisioning a distributed database cluster (e.g., storage platform 104-1) then generates a local file with cluster compute service manager 108 URL information at a specified location. During the bootstrap process, the KMS connector 850 relies on this file to establish connection to a compute service manager 108 cluster host.
  ii. compute service manager 108 encryption key fetch calls would piggyback the latest compute service manager 108 topology information, this information is persisted by the KMS connector 850 as a local file (known location) and read during process/cluster restarts.

The following discussion relates to encrypt key server 854, included in storage platform 104-1 providing a distributed database cluster.

In an implementation, encrypt key server 854 provides the following features:
1. A distributed database role/process to allow fetching (refresh/point-lookups) of encryption keys from external KMS interfaces (e.g., encryption key manager 810). The process connects with the KMS connector 850 REST interface to fetch required encryption keys.
2. Periodically refresh FMK to handle key-rotation use case.
3. On an encryption-key fetch from KMS connector 850, apply HMAC (hash-based message authentication code) derivative function to generate a new encryption key and cache it in-memory. The in-memory cache is used to serve encryption key fetch requests from other distributed database processes.

Given that encryption keys are needed as part of cluster-recovery, this process/role needs to be recruited at the start of the cluster-recovery. All other distributed database processes will interact with this process to obtain encryption keys needed to encrypt and/or decrypt the data payload.

The following discussion relates to commit proxies 852, which is included in storage platform 104-1.

In an implementation, distributed transaction manager 474 initiates a write transaction to insert/update customer records stored in the distributed database cluster, the transaction is received by a commit proxy, which then resolves the transaction by checking if the transaction is allowed. If allowed, the transaction is committed to transaction logs. The subject system extends commit proxy responsibilities by encrypting mutations (e.g., changes to key-value pairs, and the like) using a HTMK derived encryption key before mutations get persisted into transaction logs (e.g., using durable storage such as non-volatile storage devices and the like). As referred to herein, a mutation is an event or operation that deletes a key or changes the value that a key is pointing toward. For example, mutations occur when transactions including operations such as insert, update, delete, merge, and the like, are executed.

In an example, the encryption key derivation is achieved using the below formula:

DEK=HMAC SHA$_{256}$(HTMK∥UID)

where
DEK=Derived Encryption Key
HTMK=Hybrid Tenant Master Encryption Key
UID=Host local random generated number The Transaction State Store (also referred as TxnStateStore) is a Key-Value datastore used by a distributed database to store metadata about the database for bootstrap purposes. The data stored in this store plays a critical role in: guiding the transaction system to persist writes (storage tags to mutations at commit proxies), and managing distributed database internal data movement. The data stored in TxnStateStore can cross tenant defined boundaries, and leverages HCMK derived encryption key to encrypt such data.

As part of encryption, each mutation is appended by a plaintext encryption-header to assist decrypting the information for reads. In an implementation, the mutation format is as follows:

```
|<------plain text--------->|<------encrypted-------->|
KeyID - 8 bytes             Mutation
UID - Random
number -8 bytes
```

Commit proxies can cache (in-memory) recently used encryption-keys to optimize network traffic due to encryption related operations. Further, the caching improves performance, avoiding frequent RPC calls to encrypt key server 854. Each encryption-key in the cache has a threshold Time-To-Live interval (10 mins) and on expiry, the process would need to interact with encrypt key server 854 to fetch the required encryption-keys. In an implementation, the same caching policy is followed by encryption storage server 482 and hybrid tables 870.

The following discussion relates to storage nodes (e.g., using B+ tree structure) for encryption storage server 860. In an embodiment, encryption storage server 860 encrypts node data from a B+ tree structure for storing on distributed database data store 480, in accordance with the following discussion.

For storing data by encryption storage server 860, a B+ tree structure is utilized that stores data into two types of nodes:
1. Non-leaf nodes: Nodes will not store any customer RV information and only stores customer RK (prefix compression is applied).
2. Leaf Nodes: It stores {RK, RV} tuples for a given key-range.

In an implementation, both above mentioned nodes are converted into one or more fixed size pages (e.g., 4k or 8k) before getting persisted on a durable storage; the encryption is performed at the node level instead of "page level" i.e. all pages constituting a given node are encrypted using an encryption key generated with below formula:

DEK=HMAC SHA$_{256}$(HTMK∥UID)

where
DEK=Derived Encryption Key
HTMK=Hybrid Tenant Master Encryption Key
UID=Host local random generated number Further, a node header is already extended with a 1 byte "flag" field to support encryption. As part of the encryption rollout, the version is incremented and all new records flushed to disk would set appropriate "flag" bits defining "encryption header size". In an implementation, the new updated node disk layout is the following format:

```
|<------plain text--------->|<------encrypted-------->|
Encryption Header           Redwood Node Data
1. Key-Id - 1 byte          (encrypted)
2. UID - 8 bytes
3. Reserved - 7 bytes
```

In some instances, a given node of the B+ tree includes all record keys corresponding to a single tenant (or customer).

However, in some instances, information for more than one tenant (or customer) is required to be included in a given node of the B+ tree. To preserve confidentiality/privacy between information of different tenants, in an implementation, non-sensitive portions (e.g., record keys) of node data are truncated and included in the node. For example, if node data is 64 bytes, and the first 8 byes includes information indicating which transaction domain that the node data belongs to, the first 8 bytes are included (e.g., respective record keys for different tenants) in a node where information for more than one tenant is included. However, when traversing down the B+ tree from the root node, and there is sufficient number of record keys, then record keys are grouped together, where feasible, to store in a single node of the tree (instead of commingling record keys of different tenants in a single node).

In an example where a given key can include sensitive employee information (e.g., social security number, phone number), such sensitive information can include a prefix with non-sensitive information (e.g., tenant identifier), as shown in the following:

<Tenant Identifier> <ID, SSN, PHONE-NUM>

In an example, three different tenants Ti, T2, and T3 are included in a given B+ tree structure. At the root node, tenant prefix TP1, tenant prefix TP2, and tenant prefix TP3 are provided for each respective tenant. At a first level below the root node, there are nodes for a first node with tenant identifiers (TP1, TP2) and a second node with tenant identifier (TP3). At a second level below the first level, there is a first node with keys <TP1x TP1y> and a second node with a key <TP2x>. At respective leaf nodes below level 2, a first leaf node includes keys TP1x, TP1y, and TP1z for tenant T1, a second leaf node includes a set of keys for tenant T2, and a third leaf node includes a set of keys for tenant T3. This example can be represented by the following:

Root node—(TP1, TP2, TP3)
L1 nodes—(TP1, TP2) (TP3)
L2 nodes—<TP1x TP1y> <TP2x> <TP3z>
Leaf nodes—<TP1xa TP1yb TP1zc> <TP2 . . . > <TP3 . . . >
where Tenant Identifier==TP<1/2/3>

The following discussion relates to hybrid tables 870, which is included in storage platform 104-1. Although hybrid tables 870 are shown (for the purposes of discussion) as separate from distributed database data store 480, it is understood that in an implementation, such hybrid tables are stored in distributed database data store 480 corresponding to a given cluster for the distributed database.

In an implementation, a given hybrid table from hybrid tables 870 can pull committed mutations from a storage server(s) (e.g., encryption storage server 860) and persist such mutations as "files" stored on a cloud backed blob storage (e.g., Amazon S3, and the like). Each persisted file stores mutations for a given key-range, and the encryption key is generated using the below formula:

DEK=HMAC SHA$_{256}$(HTMK+FID)

where
DEK=Derived Encryption Key
HTMK=Hybrid Tenant Master Encryption Key
FID=File Identifier (unique)

|<------plain text-------->|<------encrypted------->|
Hybrid File Header        Hybrid File
Encrypt Key-Id -
1 byte
FID - 8 bytes In an implementation, a physical hybrid file is split into multiple logical "chunks", where each "chunk" further subdivides the Key-Range. The "file header" can encode necessary information to enable reading only required chunk(s) to assist point-lookups. This approach can be extended to support encryption use case where "each chunk" gets encrypted using a separate encryption-key and "file header" encodes required chunk to encryption-key mapping.

The following discussion relates to decryption on read operations or transactions.

To assist reads, distributed database processes (encryption storage server 482, hybrid table workers for hybrid tables 870) are configured to read/parse an encryption header, where to decrypt the encrypted data includes the below steps:

1. Interact with encrypt key server 854 to fetch desired base encryption key (HCMK or HTMK) corresponding to the key-id persisted in the encryption header.
2. Reconstruct the encryption key.
3. Decrypt the encrypted data.

The following discussion relates to key rotation.

The subject system's generated encryption keys get rotated periodically (e.g., every 30 days, and the like).

1. Transaction Log: data is temporarily persisted in DiskQueues and is flushed to long term durable storage, hence, can be ignored for key-rotation purposes.
2. Encryption storage server: distributed database storage server wiggle mechanism can be extended to support configurable TimeToLive (TTL) features for storage server files. When enabled, the cluster excludes the encryption storage server 482 at a convenient time based on a defined TTL, after moving and re-encrypting its data, using an active encryption key, to other encryption storage servers. Given that no encryption storage server 482 data is stored longer than TTL, hence, encryption key lifetime is bounded by a TTL meeting rekeying requirements.
3. Hybrid Tables: background table-scrubber tasks are provided to remove files that have aged out of the hybrid MVCC window; the same task can be overloaded to perform rekeying as needed.

Figure 9:
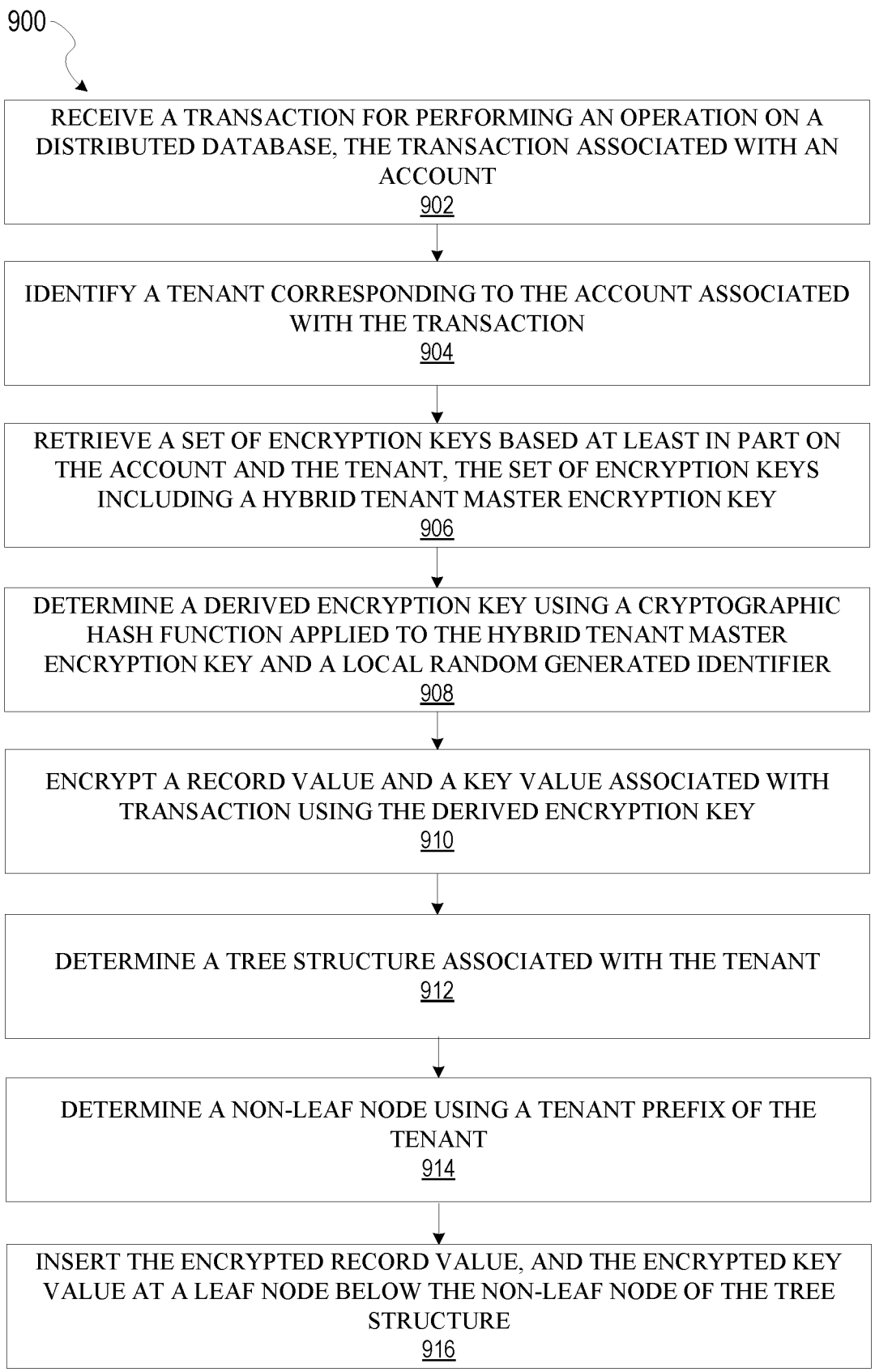
FIG. 9 is a flow diagram illustrating operations of a database system in performing a method, in accordance with some embodiments of the present disclosure.

FIG. 9 is a flow diagram illustrating operations of a database system in performing a method, in accordance with some embodiments of the present disclosure. The method 900 may be embodied in computer-readable instructions for execution by one or more hardware components (e.g., one or more processors) such that the operations of the method 900 may be performed by components of network-based database system 102, such as components of the compute service manager 108, a node in the execution platform 110, or storage platform 104-1. Accordingly, the method 900 is described below, by way of example with reference thereto. However, it shall be appreciated that the method 900 may be deployed on various other hardware configurations and is not intended to be limited to deployment within the network-based database system 102.

At operation 902, compute service manager 108 receives a transaction for performing an operation on a distributed database, the transaction associated with an account.

At operation 904, compute service manager 108 identifies a tenant corresponding to the account associated with the transaction.

At operation 906, encrypt key server 854 retrieves a set of encryption keys based at least in part on the account and the tenant, the set of encryption keys including a hybrid tenant master encryption key.

At operation 908, encryption storage server 482 determines a derived encryption key using a cryptographic hash function applied to the hybrid tenant master encryption key and a local random generated identifier.

At operation 910, encryption storage server 482 encrypts a record value and a key value associated with transaction using the derived encryption key.

At operation 912, encryption storage server 482 determines a tree structure associated with the tenant.

At operation 914, encryption storage server 482 determines a non-leaf node using a tenant prefix of the tenant.

At operation 916, encryption storage server 482 inserts the encrypted record value, and the encrypted key value at a leaf node below the non-leaf node of the tree structure.

In an embodiment, further operations include: receiving a second transaction for performing a read operation on the distributed database, the second transaction associated with the account; identifying the tenant corresponding to the account associated with the transaction; retrieving the set of encryption keys based at least in part on the account and the tenant; decrypting, using the set of encryption keys, data from the distributed database; and providing the decrypted data as a result of the second transaction.

In an embodiment, identifying the tenant corresponding to the account associated with the transaction comprises: determining a tenant identifier associated the transaction, the tenant identifier comprising a prefix indicating a transaction domain of the tenant, the prefix mapping to data stored in the distributed database.

In an embodiment, retrieving the set of encryption keys comprises: sending a request, using an interface provided by a key management service, the set of encryption keys, the set of encryption keys being stored in a metadata database, the request including a tenant identifier.

In an embodiment, determining the derived encryption key comprises: applying a hash-based message authentication code with the cryptographic hash function and a secret cryptographic key.

In an embodiment, the cryptographic hash function comprises SHA-256 and the secret cryptographic key comprises the hybrid tenant master encryption key.

In an embodiment, further operations include: storing, in a portion of the distributed database separate from the tree structure, information including node data comprising the encrypted record value and the encrypted key value from the leaf node, the information further including an encryption footer appended to the node data, the encryption foot comprising a tenant identifier and the local random generated identifier.

In an embodiment, the operation comprises a write operation.

In an embodiment, the tree structure comprises a B+ tree structure.

In an embodiment, the B+ tree structure comprises at least a root node, a first set of nodes below the root node, a second set of nodes below the first set of nodes, and a set of leaf nodes below the second set of nodes.

Figure 10:
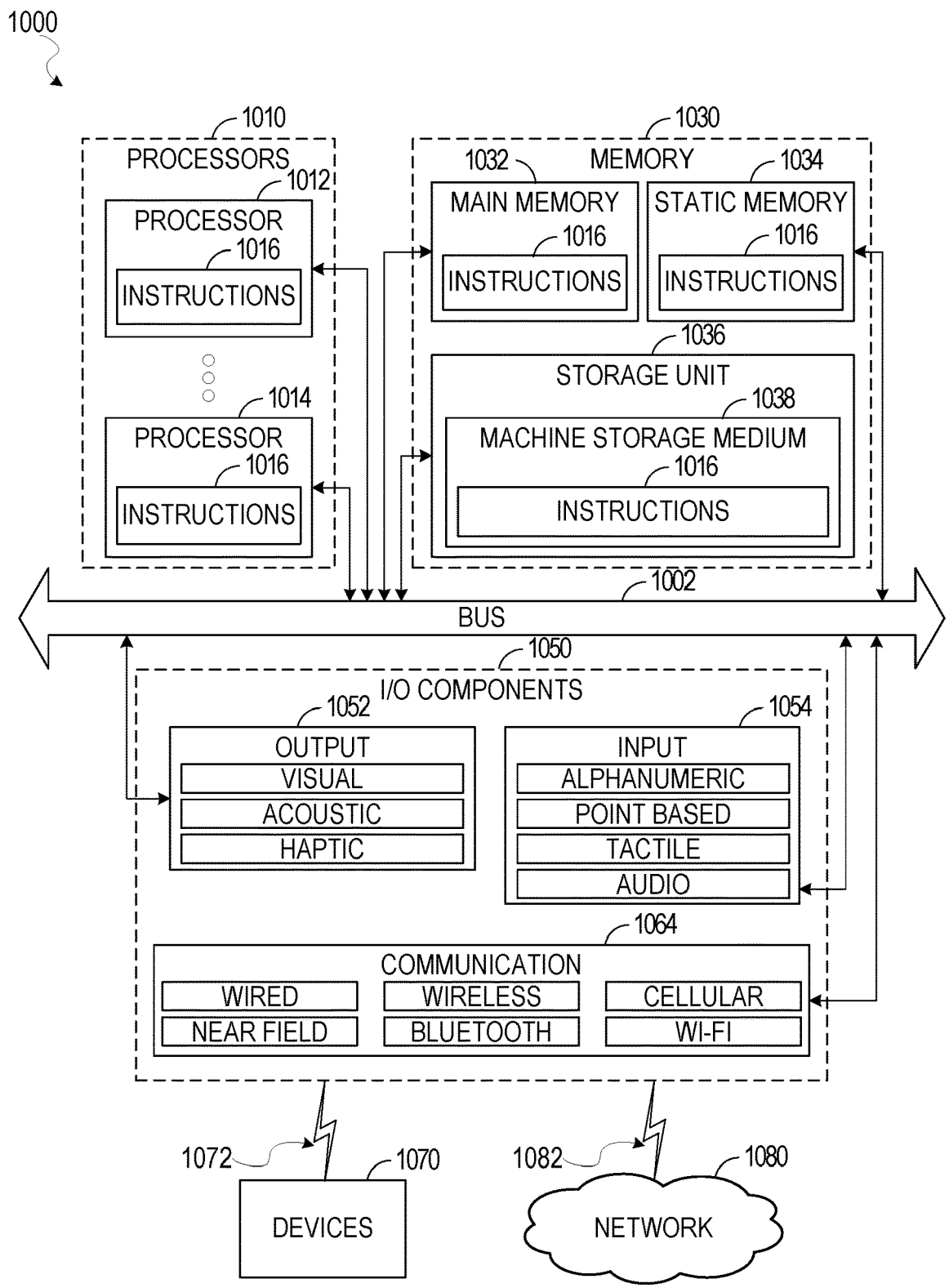
FIG. 10 illustrates a diagrammatic representation of a machine in the form of a computer system within which a set of instructions may be executed for causing the machine to perform any one or more of the methodologies discussed herein, in accordance with some embodiments of the present disclosure.

FIG. 10 illustrates a diagrammatic representation of a machine 1000 in the form of a computer system within which a set of instructions may be executed for causing the machine 1000 to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies, data flows, or processing flows discussed herein may be executed. In this way, the instructions 1016 transform a general, non-programmed machine into a particular machine 1000 (e.g., the compute service manager 108 or a node in the execution platform 110) that is specially configured to carry out any one of the described and illustrated functions in the manner described herein.

In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 includes processors 1010, memory 1030, and input/output (I/O) components 1050 configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors 1010 that may comprise two or more independent processors (sometimes referred to as "cores") that may execute instructions 1016 contemporaneously. Although FIG. 10 shows multiple processors 1010, the machine 1000 may include a single processor with a single core, a single processor with multiple cores (e.g., a multi-core processor), multiple processors with a single core, multiple processors with multiple cores, or any combination thereof.

The memory 1030 may include a main memory 1032, a static memory 1034, and a storage unit 1036, all accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within machine storage medium 1038 of the storage unit 1036, within at least one of the processors 1010 (e.g., within the processor's cache memory), or any suitable combination thereof, during execution thereof by the machine 1000.

The I/O components 1050 include components to receive input, provide output, produce output, transmit information, exchange information, capture measurements, and so on. The specific I/O components 1050 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, and other communication components to provide communication via other modalities. The devices 1070 may be another machine or any of a wide variety of peripheral devices (e.g., a peripheral device coupled via a universal serial bus (USB)). For example, as noted above, the machine 1000 may correspond to any one of the compute service manager 108 or the execution platform 110, and the devices 1070 may include the client device 114 or any other computing device described herein as being in communication with the network-based database system 102 or the cloud storage platform 104-1.

Executable Instructions and Machine Storage Medium

The various memories (e.g., 1030, 1032, 1034, and/or memory of the processor(s) 1010 and/or the storage unit 1036) may store one or more sets of instructions 1016 and data structures (e.g., software) embodying or utilized by any one or more of the methodologies or functions described herein. These instructions 1016, when executed by the processor(s) 1010, cause various operations to implement the disclosed embodiments.

As used herein, the terms "machine-storage medium," "device-storage medium," and "computer-storage medium" mean the same thing and may be used interchangeably in this disclosure. The terms refer to a single or multiple non-transitory storage devices and/or non-transitory media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1080 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 500 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

CONCLUSION

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   a memory storing instructions that cause the at least one hardware processor to perform operations comprising:
   determining a derived encryption key using a cryptographic hash function applied to a hybrid tenant master encryption key and a local random generated identifier;
   encrypting a record value and a key value associated with a transaction using the derived encryption key;
   determining a non-leaf node using a tenant prefix of a tenant;
   inserting the encrypted record value at a leaf node below a non-leaf node of a tree structure associated with the tenant;
   receiving a second transaction for performing a read operation on a distributed database, the second transaction associated with an account;
   retrieving a set of encryption keys based at least in part on the account and the tenant;
   decrypting, using the set of encryption keys, data from the distributed database; and
   providing the decrypted data as a result of the second transaction.

2. The system of claim 1, wherein the operations further comprise:
   prior to encrypting the record value and the key value, receiving the transaction for performing an operation on the distributed database, the transaction associated with the account; and
   identifying the tenant corresponding to the account associated with the transaction.

3. The system of claim 1, wherein the set of encryption keys includes the hybrid tenant master encryption key.

4. The system of claim 1, wherein the operations further comprise:
   receiving a third transaction for performing a read operation on the distributed database, the third transaction associated with the account;
   identifying the tenant corresponding to the account associated with the transaction;
   retrieving the set of encryption keys based at least in part on the account and the tenant;
   decrypting, using the set of encryption keys, data from the distributed database; and
   providing the decrypted data as a result of the third transaction.

5. The system of claim 1, wherein identifying the tenant corresponding to the account associated with the transaction comprises:
   determining a tenant identifier associated the transaction, the tenant identifier comprising a prefix indicating a transaction domain of the tenant, the prefix mapping to data stored in the distributed database.

6. The system of claim 1, wherein retrieving the set of encryption keys comprises:
   sending a request, using an interface provided by a key management service, the set of encryption keys, the set of encryption keys being stored in a metadata database, the request including a tenant identifier.

7. The system of claim 1, wherein determining the derived encryption key comprises:
applying a hash-based message authentication code with the cryptographic hash function and a secret cryptographic key.

8. The system of claim 7, wherein the cryptographic hash function comprises SHA-256 and the secret cryptographic key comprises the hybrid tenant master encryption key.

9. The system of claim 1, wherein the operations further comprise:
storing, in a portion of the distributed database separate from the tree structure, information including node data comprising the encrypted record value and the encrypted key value from the leaf node, the information further including an encryption footer appended to the node data, the encryption footer comprising a tenant identifier and the local random generated identifier.

10. The system of claim 9, wherein the tree structure comprises a B+ tree structure, the B+ tree structure comprises at least a root node, a first set of nodes below the root node, a second set of nodes below the first set of nodes, and a set of leaf nodes below the second set of nodes.

11. A method comprising:
determining a derived encryption key using a cryptographic hash function applied to a hybrid tenant master encryption key and a local random generated identifier;
encrypting a record value and a key value associated with a transaction using the derived encryption key;
determining a non-leaf node using a tenant prefix of a tenant;
inserting the encrypted record value at a leaf node below a non-leaf node of a tree structure associated with the tenant;
receiving a second transaction for performing a read operation on a distributed database, the second transaction associated with an account;
retrieving a set of encryption keys based at least in part on the account and the tenant;
decrypting, using the set of encryption keys, data from the distributed database; and
providing the decrypted data as a result of the second transaction.

12. The method of claim 11, further comprising:
prior to encrypting the record value and the key value, receiving the transaction for performing an operation on the distributed database, the transaction associated with the account; and
identifying the tenant corresponding to the account associated with the transaction.

13. The method of claim 11, wherein the set of encryption keys includes the hybrid tenant master encryption key.

14. The method of claim 11, further comprising:
receiving a third transaction for performing a read operation on the distributed database, the third transaction associated with the account;
identifying the tenant corresponding to the account associated with the transaction;
retrieving the set of encryption keys based at least in part on the account and the tenant;
decrypting, using the set of encryption keys, data from the distributed database; and
providing the decrypted data as a result of the third transaction.

15. The method of claim 11, wherein identifying the tenant corresponding to the account associated with the transaction comprises:
determining a tenant identifier associated the transaction, the tenant identifier comprising a prefix indicating a transaction domain of the tenant, the prefix mapping to data stored in the distributed database.

16. The method of claim 11, wherein retrieving the set of encryption keys comprises:
sending a request, using an interface provided by a key management service, the set of encryption keys, the set of encryption keys being stored in a metadata database, the request including a tenant identifier.

17. The method of claim 11, wherein determining the derived encryption key comprises:
applying a hash-based message authentication code with the cryptographic hash function and a secret cryptographic key.

18. The method of claim 17, wherein the cryptographic hash function comprises SHA-121516 and the secret cryptographic key comprises the hybrid tenant master encryption key.

19. The method of claim 11, further comprising:
storing, in a portion of the distributed database separate from the tree structure, information including node data comprising the encrypted record value and the encrypted key value from the leaf node, the information further including an encryption footer appended to the node data, the encryption footer comprising a tenant identifier and the local random generated identifier.

20. The method of claim 19, wherein the tree structure comprises a B+ tree structure, the B+ tree structure comprises at least a root node, a first set of nodes below the root node, a second set of nodes below the first set of nodes, and a set of leaf nodes below the second set of nodes.

21. A non-transitory computer-storage medium comprising instructions that, when executed by one or more processors of a machine, configure the machine to perform operations comprising:
determining a derived encryption key using a cryptographic hash function applied to a hybrid tenant master encryption key and a local random generated identifier;
encrypting a record value and a key value associated with a transaction using the derived encryption key;
determining a non-leaf node using a tenant prefix of a tenant;
inserting the encrypted record value at a leaf node below a non-leaf node of a tree structure associated with the tenant;
receiving a second transaction for performing a read operation on a distributed database, the second transaction associated with an account;
retrieving a set of encryption keys based at least in part on the account and the tenant;
decrypting, using the set of encryption keys, data from the distributed database; and
providing the decrypted data as a result of the second transaction.

22. The non-transitory computer-storage medium of claim 21, wherein the operations further comprise:
prior to encrypting the record value and the key value, receiving the transaction for performing an operation on the distributed database, the transaction associated with the account; and
identifying the tenant corresponding to the account associated with the transaction.

23. The non-transitory computer-storage medium of claim 21, wherein the set of encryption keys includes the hybrid tenant master encryption key.

24. The non-transitory computer-storage medium of claim 21, wherein the operations further comprise:
receiving a third transaction for performing a read operation on the distributed database, the third transaction associated with the account;
identifying the tenant corresponding to the account associated with the transaction;
retrieving the set of encryption keys based at least in part on the account and the tenant;
decrypting, using the set of encryption keys, data from the distributed database; and
providing the decrypted data as a result of the third transaction.

25. The non-transitory computer-storage medium of claim 21, wherein identifying the tenant corresponding to the account associated with the transaction comprises:
determining a tenant identifier associated the transaction, the tenant identifier comprising a prefix indicating a transaction domain of the tenant, the prefix mapping to data stored in the distributed database.

26. The non-transitory computer-storage medium of claim 21, wherein retrieving the set of encryption keys comprises:
sending a request, using an interface provided by a key management service, the set of encryption keys, the set of encryption keys being stored in a metadata database, the request including a tenant identifier.

27. The non-transitory computer-storage medium of claim 21, wherein determining the derived encryption key comprises:
applying a hash-based message authentication code with the cryptographic hash function and a secret cryptographic key.

28. The non-transitory computer-storage medium of claim 27, wherein the cryptographic hash function comprises SHA-222526 and the secret cryptographic key comprises the hybrid tenant master encryption key.

29. The non-transitory computer-storage medium of claim 21, wherein the operations further comprise:
storing, in a portion of the distributed database separate from the tree structure, information including node data comprising the encrypted record value and the encrypted key value from the leaf node, the information further including an encryption footer appended to the node data, the encryption footer comprising a tenant identifier and the local random generated identifier.

30. The non-transitory computer-storage medium of claim 29, wherein the tree structure comprises a B+ tree structure, the B+ tree structure comprises at least a root node, a first set of nodes below the root node, a second set of nodes below the first set of nodes, and a set of leaf nodes below the second set of nodes.

* * * * *